(12) United States Patent
Schultz et al.

(10) Patent No.: US 9,612,598 B2
(45) Date of Patent: Apr. 4, 2017

(54) UNMANNED AIRCRAFT STRUCTURE EVALUATION SYSTEM AND METHOD

(71) Applicant: Pictometry International Corp., Rochester, NY (US)

(72) Inventors: Stephen L. Schultz, West Henrietta, NY (US); John Monaco, Penfield, NY (US)

(73) Assignee: Pictometry International Corp., Rochester, NY (US)

( * ) Notice: Subject to any disclaimer, the term of this patent is extended or adjusted under 35 U.S.C. 154(b) by 131 days.

(21) Appl. No.: 14/591,556

(22) Filed: Jan. 7, 2015

(65) Prior Publication Data

US 2016/0313736 A1    Oct. 27, 2016

Related U.S. Application Data

(60) Provisional application No. 61/926,137, filed on Jan. 10, 2014.

(51) Int. Cl.
*G01C 23/00* (2006.01)
*G05D 1/00* (2006.01)
(Continued)

(52) U.S. Cl.
CPC ............ *G05D 1/0094* (2013.01); *B60R 1/00* (2013.01); *B64C 39/024* (2013.01); *B64D 47/08* (2013.01); *G01S 19/39* (2013.01); *G06F 17/3028* (2013.01); *G06F 17/30256* (2013.01); *G06F 17/30268* (2013.01); *G06K 9/0063* (2013.01); *G06T 11/60* (2013.01); *G08G 5/0039* (2013.01); *G08G 5/0069* (2013.01);
(Continued)

(58) Field of Classification Search
CPC .. G05D 1/00; B64C 39/02; G08G 5/00; G01S 19/39
USPC .......................................... 701/3, 2; 345/629
See application file for complete search history.

(56) References Cited

U.S. PATENT DOCUMENTS 2,273,876 A    2/1942  Lutz et al.
3,153,784 A   10/1964  Petrides et al.
(Continued)

FOREIGN PATENT DOCUMENTS

AT     331204 T    7/2006
BR     0316110     9/2005
(Continued)

OTHER PUBLICATIONS

International Search Report and Written Opinion of PCT/US2015/010496, Korean Intellectual Property Office, Mail date Apr. 20, 2015.
(Continued)

*Primary Examiner* — Thomas G Black
*Assistant Examiner* — Luke Huynh
(74) *Attorney, Agent, or Firm* — Dunlap Codding, P.C.

(57) ABSTRACT

An unmanned aircraft structure evaluation system includes a computer system with an input unit, a display unit, one or more processors, and one or more non-transitory computer readable medium. Image display and analysis software causes the one or more processors to generate unmanned aircraft information. The unmanned aircraft information includes flight path information configured to direct an unmanned aircraft to fly a flight path around the structure.

17 Claims, 10 Drawing Sheets

(51) Int. Cl.
*B64D 47/08* (2006.01)
*B64C 39/02* (2006.01)
*G08G 5/00* (2006.01)
*G08G 5/04* (2006.01)
*B60R 1/00* (2006.01)
*G01S 19/39* (2010.01)
*G06F 17/30* (2006.01)
*G06K 9/00* (2006.01)
*G06T 11/60* (2006.01)

(52) U.S. Cl.
CPC ........... *G08G 5/0086* (2013.01); *G08G 5/045* (2013.01); *B60R 2300/8093* (2013.01); *B64C 2201/127* (2013.01); *B64C 2201/141* (2013.01); *B64C 2201/146* (2013.01)

(56) References Cited

U.S. PATENT DOCUMENTS

| | | |
|---|---|---|
| 3,594,556 A | 7/1971 | Edwards |
| 3,614,410 A | 10/1971 | Bailey |
| 3,621,326 A | 11/1971 | Hobrough |
| 3,661,061 A | 5/1972 | Tokarz |
| 3,716,669 A | 2/1973 | Watanabe et al. |
| 3,725,563 A | 4/1973 | Woycechowsky |
| 3,864,513 A | 2/1975 | Halajian et al. |
| 3,866,602 A | 2/1975 | Furihata |
| 3,877,799 A | 4/1975 | O'Donnell |
| 4,015,080 A | 3/1977 | Moore-Searson |
| 4,044,879 A | 8/1977 | Stahl |
| 4,184,711 A | 1/1980 | Wakimoto |
| 4,240,108 A | 12/1980 | Levy |
| 4,281,354 A | 7/1981 | Conte |
| 4,344,683 A | 8/1982 | Stemme |
| 4,360,876 A | 11/1982 | Girault et al. |
| 4,382,678 A | 5/1983 | Thompson et al. |
| 4,387,056 A | 6/1983 | Stowe |
| 4,396,942 A | 8/1983 | Gates |
| 4,463,380 A | 7/1984 | Hooks |
| 4,489,322 A | 12/1984 | Zulch et al. |
| 4,490,742 A | 12/1984 | Wurtzinger |
| 4,491,399 A | 1/1985 | Bell |
| 4,495,500 A | 1/1985 | Vickers |
| 4,527,055 A | 7/1985 | Harkless et al. |
| 4,543,603 A | 9/1985 | Laures |
| 4,586,138 A | 4/1986 | Mullenhoff et al. |
| 4,635,136 A | 1/1987 | Ciampa et al. |
| 4,653,136 A | 3/1987 | Denison |
| 4,653,316 A | 3/1987 | Fukuhara |
| 4,673,988 A | 6/1987 | Jansson et al. |
| 4,686,474 A | 8/1987 | Olsen et al. |
| 4,688,092 A | 8/1987 | Kamel et al. |
| 4,689,748 A | 8/1987 | Hofmann |
| 4,707,698 A | 11/1987 | Constant et al. |
| 4,758,850 A | 7/1988 | Archdale et al. |
| 4,805,033 A | 2/1989 | Nishikawa |
| 4,807,024 A | 2/1989 | Mclaurin et al. |
| 4,814,711 A | 3/1989 | Olsen et al. |
| 4,814,896 A | 3/1989 | Heitzman et al. |
| 4,843,463 A | 6/1989 | Michetti |
| 4,899,296 A | 2/1990 | Khattak |
| 4,906,198 A | 3/1990 | Cosimano et al. |
| 4,953,227 A | 8/1990 | Katsuma et al. |
| 4,956,872 A | 9/1990 | Kimura |
| 5,034,812 A | 7/1991 | Rawlings |
| 5,086,314 A | 2/1992 | Aoki et al. |
| 5,121,222 A | 6/1992 | Endoh et al. |
| 5,138,444 A | 8/1992 | Hiramatsu |
| 5,155,597 A | 10/1992 | Lareau et al. |
| 5,164,825 A | 11/1992 | Kobayashi et al. |
| 5,166,789 A | 11/1992 | Myrick |
| 5,191,174 A | 3/1993 | Chang et al. |
| 5,200,793 A | 4/1993 | Ulich et al. |
| 5,210,586 A | 5/1993 | Grage et al. |
| 5,231,435 A | 7/1993 | Blakely |
| 5,247,356 A | 9/1993 | Ciampa |
| 5,251,037 A | 10/1993 | Busenberg |
| 5,265,173 A | 11/1993 | Griffin et al. |
| 5,267,042 A | 11/1993 | Tsuchiya et al. |
| 5,270,756 A | 12/1993 | Busenberg |
| 5,296,884 A | 3/1994 | Honda et al. |
| 5,335,072 A | 8/1994 | Tanaka et al. |
| 5,342,999 A | 8/1994 | Frei et al. |
| 5,345,086 A | 9/1994 | Bertram |
| 5,353,055 A | 10/1994 | Hiramatsu |
| 5,369,443 A | 11/1994 | Woodham |
| 5,402,170 A | 3/1995 | Parulski et al. |
| 5,414,462 A | 5/1995 | Veatch |
| 5,467,271 A | 11/1995 | Abel et al. |
| 5,481,479 A | 1/1996 | Wight et al. |
| 5,486,948 A | 1/1996 | Imai et al. |
| 5,506,644 A | 4/1996 | Suzuki et al. |
| 5,508,736 A | 4/1996 | Cooper |
| 5,555,018 A | 9/1996 | von Braun |
| 5,604,534 A | 2/1997 | Hedges et al. |
| 5,617,224 A | 4/1997 | Ichikawa et al. |
| 5,633,946 A | 5/1997 | Lachinski et al. |
| 5,668,593 A | 9/1997 | Lareau et al. |
| 5,677,515 A | 10/1997 | Selk et al. |
| 5,798,786 A | 8/1998 | Lareau et al. |
| 5,835,133 A | 11/1998 | Moreton et al. |
| 5,841,574 A | 11/1998 | Willey |
| 5,844,602 A | 12/1998 | Lareau et al. |
| 5,852,753 A | 12/1998 | Lo et al. |
| 5,894,323 A | 4/1999 | Kain et al. |
| 5,899,945 A | 5/1999 | Baylocq et al. |
| 5,963,664 A | 10/1999 | Kumar et al. |
| 6,037,945 A | 3/2000 | Loveland |
| 6,088,055 A | 7/2000 | Lareau et al. |
| 6,094,215 A | 7/2000 | Sundahl et al. |
| 6,097,854 A | 8/2000 | Szeliski et al. |
| 6,108,032 A | 8/2000 | Hoagland |
| 6,130,705 A | 10/2000 | Lareau et al. |
| 6,157,747 A | 12/2000 | Szeliski et al. |
| 6,167,300 A | 12/2000 | Cherepenin et al. |
| 6,222,583 B1 | 4/2001 | Matsumura et al. |
| 6,236,886 B1 | 5/2001 | Cherepenin et al. |
| 6,256,057 B1 | 7/2001 | Mathews et al. |
| 6,373,522 B2 | 4/2002 | Mathews et al. |
| 6,421,610 B1 | 7/2002 | Carroll et al. |
| 6,434,280 B1 | 8/2002 | Peleg et al. |
| 6,597,818 B2 | 7/2003 | Kumar et al. |
| 6,639,596 B1 | 10/2003 | Shum et al. |
| 6,711,475 B2 | 3/2004 | Murphy |
| 6,731,329 B1 | 5/2004 | Feist et al. |
| 6,747,686 B1 | 6/2004 | Bennett |
| 6,810,383 B1 | 10/2004 | Loveland |
| 6,816,819 B1 | 11/2004 | Loveland |
| 6,826,539 B2 | 11/2004 | Loveland |
| 6,829,584 B2 | 12/2004 | Loveland |
| 6,834,128 B1 | 12/2004 | Altunbasak et al. |
| 6,876,763 B2 | 4/2005 | Sorek et al. |
| 7,009,638 B2 | 3/2006 | Gruber et al. |
| 7,018,050 B2 | 3/2006 | Ulichney et al. |
| 7,046,401 B2 | 5/2006 | Dufaux et al. |
| 7,061,650 B2 | 6/2006 | Walmsley et al. |
| 7,065,260 B2 | 6/2006 | Zhang et al. |
| 7,123,382 B2 | 10/2006 | Walmsley et al. |
| 7,127,348 B2 | 10/2006 | Smitherman et al. |
| 7,133,551 B2 | 11/2006 | Chen |
| 7,142,984 B2 | 11/2006 | Rahmes et al. |
| 7,184,072 B1 * | 2/2007 | Loewen ............... G01C 11/02 348/140 |
| 7,233,691 B2 | 6/2007 | Setterholm |
| 7,262,790 B2 | 8/2007 | Bakewell |
| 7,348,895 B2 | 3/2008 | Lagassey |
| 7,509,241 B2 | 3/2009 | Guo |
| 7,728,833 B2 | 6/2010 | Verma |
| 7,832,267 B2 | 11/2010 | Woro |
| 7,844,499 B2 | 11/2010 | Yahiro |
| 8,078,396 B2 | 12/2011 | Meadow |
| 8,705,843 B2 | 4/2014 | Lieckfeldt |
| 2002/0041328 A1 | 4/2002 | LeCompte et al. |
| 2002/0041717 A1 | 4/2002 | Murata et al. |

(56) References Cited

U.S. PATENT DOCUMENTS

| | | | |
|---|---|---|---|
| 2002/0114536 | A1 | 8/2002 | Xiong et al. |
| 2003/0014224 | A1 | 1/2003 | Guo et al. |
| 2003/0043824 | A1 | 3/2003 | Remboski et al. |
| 2003/0088362 | A1 | 5/2003 | Melero et al. |
| 2003/0164962 | A1 | 9/2003 | Nims et al. |
| 2003/0214585 | A1 | 11/2003 | Bakewell |
| 2004/0105090 | A1 | 6/2004 | Schultz et al. |
| 2004/0167709 | A1 | 8/2004 | Smitherman et al. |
| 2005/0073241 | A1 | 4/2005 | Yamauchi et al. |
| 2005/0088251 | A1 | 4/2005 | Matsumoto |
| 2005/0169521 | A1 | 8/2005 | Hel-Or |
| 2006/0028550 | A1 | 2/2006 | Palmer et al. |
| 2006/0092043 | A1 | 5/2006 | Lagassey |
| 2006/0238383 | A1 | 10/2006 | Kimchi et al. |
| 2006/0250515 | A1 | 11/2006 | Koseki et al. |
| 2007/0024612 | A1 | 2/2007 | Balfour |
| 2007/0046448 | A1 | 3/2007 | Smitherman |
| 2007/0237420 | A1 | 10/2007 | Steedly et al. |
| 2008/0120031 | A1 | 5/2008 | Rosenfeld et al. |
| 2008/0123994 | A1 | 5/2008 | Schultz et al. |
| 2008/0158256 | A1* | 7/2008 | Russell .............. G06T 7/0026 345/629 |
| 2009/0177458 | A1 | 7/2009 | Hochart et al. |
| 2009/0208095 | A1 | 8/2009 | Zebedin |
| 2009/0304227 | A1 | 12/2009 | Kennedy et al. |
| 2010/0017114 | A1* | 1/2010 | Tehan ................. G05D 1/0646 701/423 |
| 2010/0296693 | A1 | 11/2010 | Thornberry et al. |
| 2011/0033110 | A1 | 2/2011 | Shimamura et al. |
| 2013/0246204 | A1 | 9/2013 | Thornberry et al. |
| 2013/0317667 | A1* | 11/2013 | Kruglick .............. B64C 39/024 701/2 |

FOREIGN PATENT DOCUMENTS

| | | |
|---|---|---|
| CA | 2402234 | 9/2000 |
| CA | 2505566 | 5/2004 |
| CN | 1735897 A | 2/2006 |
| DE | 60017384 T | 3/2006 |
| DE | 60306301 T | 11/2006 |
| DK | 1418402 T | 10/2006 |
| EP | 1010966 | 2/1999 |
| EP | 1180967 | 2/2002 |
| EP | 1418402 | 5/2004 |
| EP | 1696204 | 8/2006 |
| ES | 2266704 T | 3/2007 |
| JP | 2000-175183 A | 6/2000 |
| JP | 2000-341672 A | 12/2000 |
| JP | 2003/317089 A | 11/2003 |
| KR | 10-2012-0060340 A | 6/2012 |
| MX | PA05004987 | 2/2006 |
| WO | WO99/18732 | 4/1999 |
| WO | WO/00/53090 | 9/2000 |
| WO | WO/2004/044692 | 5/2004 |
| WO | WO/2005/088251 | 9/2005 |
| WO | WO/2008/028040 | 3/2008 |

OTHER PUBLICATIONS

Ackermann, Prospects of Kinematic GPS Aerial Triangulation, ITC Journal, 1992.

Ciampa, John A., "Pictometry Digital Video Mapping", SPIE, vol. 2598, pp. 140-148, 1995.

Ciampa, J. A., Oversee, Presented at Reconstruction After Urban earthquakes, Buffalo, NY, 1989.

Dunford et al., Remote Sensing for Rural Development Planning in Africa, The Journal for the International Institute for Aerial Survey and Earth Sciences, 2:99-108, 1983.

Gagnon, P.A., Agnard, J. P., Nolette, C., & Boulianne, M., "A Micro-Computer based General Photogrammetric System", Photogrammetric Engineering and Remote Sensing, vol. 56, No. 5., pp. 623-625, 1990.

Konecny, G., "Issues of Digital Mapping", Leibniz University Hannover, Germany, GIS Ostrava 2008, Ostrava 27.—Jan. 30, 2008, pp. 1-8.

Konecny, G., "Analytical Aerial Triangulation with Convergent Photography", Department of Surveying Engineering, University of New Brunswick, pp. 37-57, 1966.

Konecny, G., "Interior Orientation and Convergent Photography", Photogrammetric Engineering, pp. 625-634, 1965.

Graham, Lee A., "Airborne Video for Near-Real-Time Vegetation Mapping", Journal of Forestry, 8:28-32, 1993.

Graham, Horita TRG-50 SMPTE Time-Code Reader, Generator, Window Inserter, 1990.

Hess, L.L, et al., "Geocoded Digital Videography for Validation of Land Cover Mapping in the Amazon Basin", International Journal of Remote Sensing, vol. 23, No. 7, pp. 1527-1555, 2002.

Hinthorne, J., et al., "Image Processing in the Grass GIS", Geoscience and Remote Sensing Symposium, 4:2227-2229, 1991.

Imhof, Ralph K., "Mapping from Oblique Photographs", Manual of Photogrammetry, Chapter 18, 1966.

Jensen, John R., Introductory Digital Image Processing: A Remote Sensing Perspective, Prentice-Hall, 1986; 399 pages.

Lapine, Lewis A., "Practical Photogrammetric Control by Kinematic GPS", GPS World, 1(3):44-49, 1990.

Lapine, Lewis A., Airborne Kinematic GPS Positioning for Photogrammetry—The Determination of the Camera Exposure Station, Silver Spring, MD, 11 pages, at least as early as 2000.

Linden et al., Airborne Video Automated Processing, US Forest Service Internal report, Fort Collins, CO, 1993.

Myhre, Dick, "Airborne Video System Users Guide", USDA Forest Service, Forest Pest Management Applications Group, published by Management Assistance Corporation of America, 6 pages, 1992.

Myhre et al., "An Airborne Video System Developed Within Forest Pest Management—Status and Activities", 10 pages, 1992.

Myhre et al., "Airborne Videography—A Potential Tool for Resource Managers"—Proceedings: Resource Technology 90, 2nd International Symposium on Advanced Technology in Natural Resource Management, 5 pages, 1990.

Myhre et al., Aerial Photography for Forest Pest Management, Proceedings of Second Forest Service Remote Sensing Applications Conference, Slidell, Louisiana, 153-162, 1988.

Myhre et al., "Airborne Video Technology", Forest Pest Management/Methods Application Group, Fort Collins, CO, pp. 1-6, at least as early as Jul. 30, 2006.

Norton-Griffiths et al., 1982. "Sample surveys from light aircraft combining visual observations and very large scale color photography". University of Arizona Remote Sensing Newsletter 82-2:1-4.

Norton-Griffiths et al., "Aerial Point Sampling for Land Use Surveys", Journal of Biogeography, 15:149-156, 1988.

Novak, Rectification of Digital Imagery, Photogrammetric Engineering and Remote Sensing, 339-344, 1992.

Slaymaker, Dana M., "Point Sampling Surveys with GPS-logged Aerial Videography", Gap Bulletin No. 5, University of Idaho, http://www.gap.uidaho.edu/Bulletins/5/PSSwGPS.html, 1996.

Slaymaker, et al., "Madagascar Protected Areas Mapped with GPS-logged Aerial Video and 35mm Air Photos", Earth Observation magazine, vol. 9, No. 1, http://www.eomonline.com/Common/Archives/2000jan/00jan_tableofcontents.html, pp. 1-4, 2000.

Slaymaker, et al., "Cost-effective Determination of Biomass from Aerial Images", Lecture Notes in Computer Science, 1737:67-76, http://portal.acm.org/citation.cfm?id=648004.743267 &coll=GUIDE&dl=, 1999.

Slaymaker, et al., "A System for Real-time Generation of Georeferenced Terrain Models", 4232A-08, SPIE Enabling Technologies for Law Enforcement Boston, MA, ftp://vis-ftp.cs.umass.edu/Paper/schults/spie2000/pdf, 2000.

Slaymaker, et al.,"Integrating Small Format Aerial Photography, Videography, and a Laser Profiler for Environmental Monitoring", In ISPRS WG III/1 Workshop on Integrated Sensor Calibration and Orientation, Portland, Maine, 1999.

Slaymaker, et al., "Calculating Forest Biomass With Small Format Aerial Photography, Videography and a Profiling Laser", In Proceedings of the 17th Biennial Workshop on Color Photography and Videography in Resource Assessment, Reno, NV, 1999.

(56) References Cited

OTHER PUBLICATIONS

Slaymaker et al., Mapping Deciduous Forests in Southern New England using Aerial Videography and Hyperclustered Multi-Temporal Landsat TM Imagery, Department of Forestry and Wildlife Management, University of Massachusetts, 1996.
Star et al., "Geographic Information Systems an Introduction", Prentice-Hall, 1990.
Tomasi et al., "Shape and Motion from Image Streams: a Factorization Method"—Full Report on the Orthographic Case, pp. 9795-9802, 1992.
Warren, Fire Mapping with the Fire Mousetrap, Aviation and Fire Management, Advanced Electronics System Development Group, USDA Forest Service, 1986.
Welch, R., "Desktop Mapping with Personal Computers", Photogrammetric Engineering and Remote Sensing, 1651-1662, 1989.
Westervelt, James, "Introduction to GRASS 4", pp. 1-25, 1991.
"RGB Spectrum Videographics Report, vol. 4, No. 1, McDonnell Douglas Integrates RGB Spectrum Systems in Helicopter Simulators", pp. 1-6, 1995.
RGB "Computer Wall", RGB Spectrum, 4 pages, 1995.
"The First Scan Converter with Digital Video Output", Introducing . . . The RGB/Videolink 1700D-1, RGB Spectrum, 2 pages, 1995.
ERDAS Field Guide, Version 7.4, A Manual for a commercial image processing system, 1990.
"Image Measurement and Aerial Photography", Magazine for all branches of Photogrammetry and its fringe areas, Organ of the German Photogrammetry Association, Berlin-Wilmersdorf, No. 1, 1958.
"Airvideo Analysis", MicroImages, Inc., Lincoln, NE, 1 page, Dec. 1992.
Zhu, Zhigang, Hanson, Allen R., "Mosaic-Based 3D Scene Representation and Rendering", Image Processing, 2005, ICIP 2005, IEEE International Conference on 1(2005).
Mostafa, et al., "Direct Positioning and Orientation Systems How do they Work? What is the Attainable Accuracy?", Proceeding, American Society of Photogrammetry and Remote Sensing Annual Meeting, St. Louis, MO, Apr. 24-27, 2001.
"POS AV" georeferenced by APPLANIX aided inertial technology, http://www.applanix.com/products/posav_index.php.
Mostafa, et al., "Ground Accuracy from Directly Georeferenced Imagery", Published in GIM International vol. 14 N. 12 Dec. 2000.
Mostafa, et al., "Airborne Direct Georeferencing of Frame Imagery: An Error Budget", The 3$^{rd}$ International Symposium on Mobile Mapping Technology, Cairo, Egypt, Jan. 3-5, 2001.
Mostafa, M.R. And Hutton, J., "Airborne Kinematic Positioning and Attitude Determination Without Base Stations", Proceedings, International Symposium on Kinematic Systems in Geodesy, Geomatics, and Navigation (KIS 2001) Banff, Alberta, Canada, Jun. 4-8, 2001.
Mostafa, et al., "Airborne DGPS Without Dedicated Base Stations for Mapping Applications", Proceedings of ION-GPS 2001, Salt Lake City, Utah, USA, Sep. 11-14.
Mostafa, "ISAT Direct Exterior Orientation QA/QC Strategy Using POS Data", Proceedings of OEEPE Workshop: Integrated Sensor Orientation, Hanover, Germany, Sep. 17-18, 2001.
Mostafa, "Camera/IMU Boresight Calibration: New Advances and Performance Analysis", Proceedings of the ASPRS Annual Meeting, Washington, D.C., Apr. 21-26, 2002.
Hiatt, "Sensor Integration Aids Mapping at Ground Zero", Photogrammetric Engineering and Remote Sensing, Sep. 2002, p. 877-878.
Mostafa, "Precision Aircraft GPS Positioning Using CORS", Photogrammetric Engineering and Remote Sensing, Nov. 2002, p. 1125-1126.
Mostafa, et al., System Performance Analysis of INS/DGPS Integrated System for Mobile Mapping System (MMS), Department of Geomatics Engineering, University of Calgary, Commission VI, WG VI/4, Mar. 2004.

Artes F., & Hutton, J., "GPS and Inertial Navigation Delivering", Sep. 2005, GEOconnexion International Magazine, p. 52-53, Sep. 2005.
"POS AV" APPLANIX, Product Outline, airborne@applanix.com, 3 pages, Mar. 28, 2007.
POSTrack, "Factsheet", APPLANIX, Ontario, Canada, www.applanix.com, Mar. 2007.
POS AV "Digital Frame Camera Applications", 3001 Inc., Brochure, 2007.
POS AV "Digital Scanner Applications", Earthdata Brochure, Mar. 2007.
POS AV "Film Camera Applications" AeroMap Brochure, Mar. 2007.
POS AV "LIDAR Applications" MD Atlantic Brochure, Mar. 2007.
POS AV "OEM System Specifications", 2005.
POS AV "Synthetic Aperture Radar Applications", Overview, Orbisat Brochure, Mar. 2007.
"POSTrack V5 Specifications" 2005.
"Remote Sensing for Resource Inventory Planning and Monitoring", Proceeding of the Second Forest Service Remote Sensing Applications Conference—Slidell, Louisiana and NSTL, Mississippi, Apr. 11-15, 1988.
"Protecting Natural Resources with Remote Sensing", Proceeding of the Third Forest Service Remote Sensing Applications Conference—Apr. 9-13, 1990.
Heipke, et al, "Test Goals and Test Set Up for the OEEPE Test—Integrated Sensor Orientation", 1999.
Kumar, et al., "Registration of Video to Georeferenced Imagery", Sarnoff Corporation, CN5300, Princeton, NJ, 1998.
McConnel, Proceedings Aerial Pest Detection and Monitoring Workshop—1994.pdf, USDA Forest Service Forest Pest Management, Northern Region, Intermountain region, Forest Insects and Diseases, Pacific Northwest Region.
"Standards for Digital Orthophotos ", National Mapping Program Technical Instructions, US Department of the Interior, Dec. 1996.
Tao, "Mobile Mapping Technology for Road Network Data Acquisition", Journal of Geospatial Engineering, vol. 2, No. 2, pp. 1-13, 2000.
"Mobile Mapping Systems Lesson 4", Lesson 4 SURE 382 Geographic Information Systems II, pp. 1-29, Jul. 2, 2006.
Konecny, G., "Mechanische Radialtriangulation mit Konvergentaufnahmen", Bildmessung and Luftbildwesen, 1958, Nr. 1.
Myhre, "ASPRS/ACSM/RT 92" Technical papers, Washington, D.C., vol. 5 Resource Technology 92, Aug. 3-8, 1992.
Rattigan, "Towns get new view from above," *The Boston Globe*, Sep. 5, 2002.
Mostafa, et al., "Digital image georeferencing from a multiple camera system by GPS/INS," *ISP RS Journal of Photogrammetry & Remote Sensing*, 56(I): I-12, Jun. 2001.
Dillow, "Grin, or bare it, for aerial shot," *Orange County Register* (California), Feb. 25, 2001.
Anonymous, "Live automatic coordinates for aerial images," *Advanced Imaging*, 12(6):51, Jun. 1997.
Anonymous, "Pictometry and US Geological Survey announce—Cooperative Research and Development Agreement," Press Release published Oct. 20, 1999.
Miller, "Digital software gives small Arlington the Big Picture," *Government Computer NewsState & Local*, 7(12), Dec. 2001.
Garrett, "Pictometry: Aerial photography on steroids," *Law Enforcement Technology* 29(7):114-116, Jul. 2002.
Weaver, "County gets an eyeful," *The Post-Standard* (Syracuse, NY), May 18, 2002.
Reed, "Firm gets latitude to map O.C. in 3D," *Orange County Register* (California), Sep. 27, 2000.
Reyes, "Orange County freezes ambitious aerial photography project," *Los Angeles Times*, Oct. 16, 2000.
Aerowest Pricelist of Geodata as of Oct. 21, 2005 and translations to English 3 pages.
www.archive.org Web site showing archive of German AeroDach Web Site http://www.aerodach.de from Jun. 13, 2004 (retrieved Sep. 20, 2012) and translations to English 4 pages.

(56) References Cited

OTHER PUBLICATIONS

AeroDach® Online Roof Evaluation Standard Delivery Format and 3D Data File: Document Version 01.00.2002 with publication in 2002, 13 pages.

Noronha et al., "Detection and Modeling of Building from Multiple Aerial Images," Institute for Robotics and Intelligent Systems, University of Southern California, Nov. 27, 2001, 32 pages.

Applicad Reports dated Nov. 25, 1999-Mar. 9, 2005, 50 pages.

Applicad Online Product Bulletin archive from Jan. 7, 2003, 4 pages.

Applicad Sorcerer Guide, Version 3, Sep. 8, 1999, 142 pages.

Xactimate Claims Estimating Software archive from Feb. 12, 2010, 8 pages.

Bignone et al, Automatic Extraction of Generic House Roofs from High Resolution Aerial Imagery, Communication Technology Laboratory, Swiss Federal Institute of Technology ETH, CH-8092 Zurich, Switzerland, 12 pages, 1996.

Geospan 2007 Job proposal.

Greening et al., Commercial Applications of GPS-Assisted Photogrammetry, Presented at GIS/LIS Annual Conference and Exposition, Phoenix, AZ, Oct. 1994.

Mission Planner Overview [online webpage]; Retrieved from http://ardupilotorg/planner/docs/mission-planner-overview.html; Retrieved Dec. 15, 2016.

Planning a Mission with Waypoints and Events [online webpage]; Retrieved from http://ardupilot.org/planner/docs/common-planning-a-mission-withwaypoints-and-events.html; Retrieved Dec. 15, 2016.

Kespry Aerial Data System [online webpage]; Retrieved from https://web.archive.org/web/20141118185641/http://kespry.com/; Retrieved Dec. 15, 2016.

* cited by examiner

UNMANNED AIRCRAFT STRUCTURE EVALUATION SYSTEM AND METHOD

CROSS REFERENCE TO RELATED APPLICATION/INCORPORATION BY REFERENCE STATEMENT

The present patent application incorporates by reference the entire provisional patent application identified by U.S. Ser. No. 61/926,137, filed on Jan. 10, 2014, and claims priority thereto under 35 U.S.C. 119(e).

BACKGROUND

Unmanned aerial vehicles (UAVs), commonly known as drones, are aircraft without a human pilot on board. Flight may be controlled by computers or by remote control of a pilot located on the ground.

Within the insurance industry, use of UAVs may aid in obtaining evaluation estimates for structures, such as roofs, that may be difficult to access. For example, a camera may be placed on the UAV so that the roof of a structure may be viewed without having to physically climb onto the roof.

The flight plan of the UAV may be based on evaluation of the geographic area around the structure, and is generally individualized for each structure. Currently within the industry, flight plans and locations of capture images are manually selected by a user.

BRIEF DESCRIPTION OF THE SEVERAL VIEWS OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, graphs, drawings, and appendices. In the drawings.

DETAILED DESCRIPTION

Figure 1:
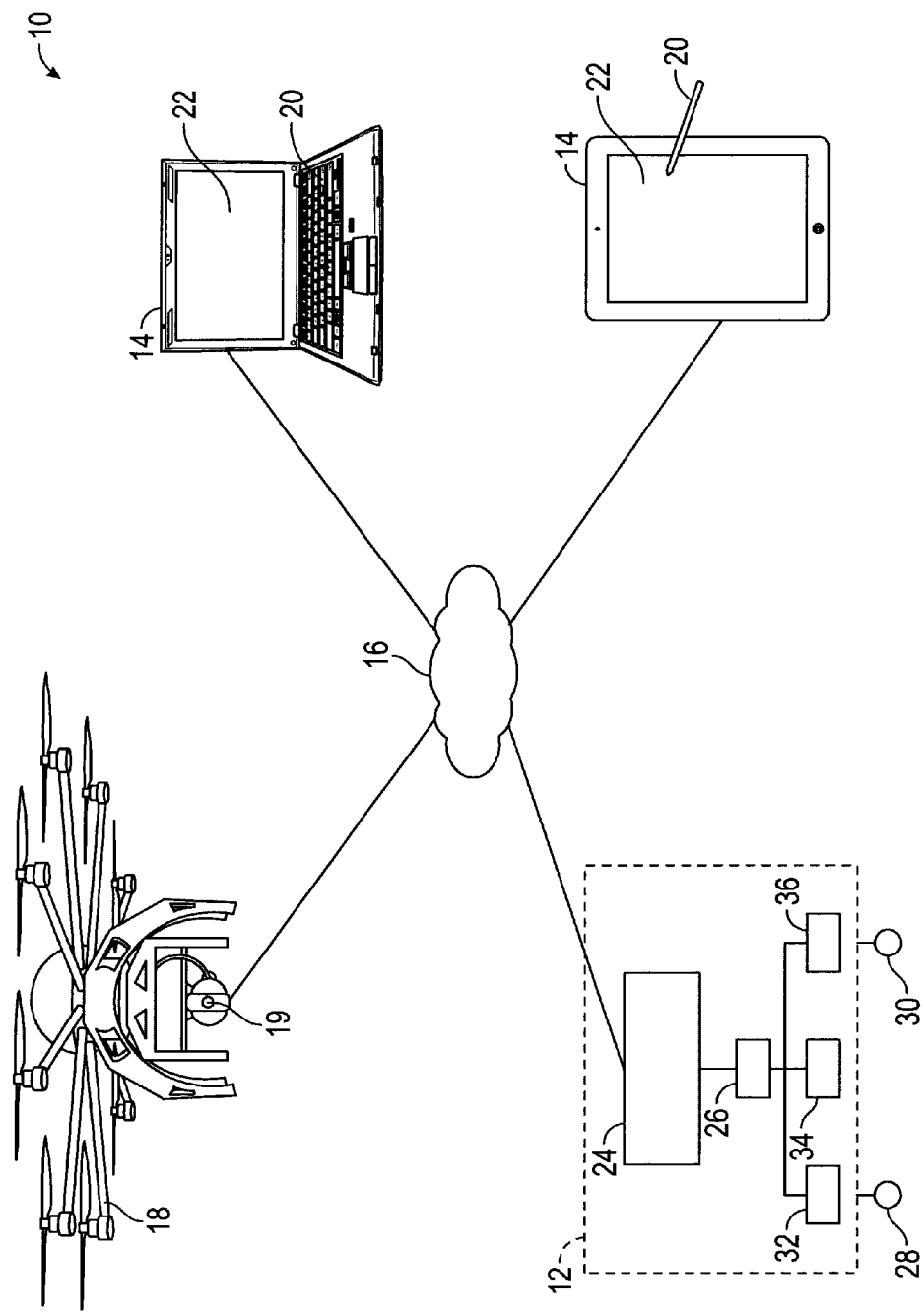
FIG. 1 is a schematic diagram of an embodiment of an unmanned aircraft structure evaluation system according to the instant disclosure.

Before explaining at least one embodiment of the inventive concept disclosed herein in detail, it is to be understood that the inventive concept is not limited in its application to the details of construction and the arrangement of the components or steps or methodologies set forth in the following description or illustrated in the drawings. The inventive concept disclosed herein is capable of other embodiments or of being practiced or carried out in various ways. Also, it is to be understood that the phraseology and terminology employed herein is for the purpose of description and should not be regarded as limiting in any way.

In the following detailed description of embodiments of the inventive concept, numerous specific details are set forth in order to provide a more thorough understanding of the inventive concept. It will be apparent to one of ordinary skill in the art, however, that the inventive concept within the disclosure may be practiced without these specific details. In other instances, well-known features have not been described in detail to avoid unnecessarily complicating the instant disclosure.

As used herein, the terms "network-based", "cloud-based" and any variations thereof, are intended to include the provision of configurable computational resources on demand via interfacing with a computer and/or computer network, with software and/or data at least partially located on the computer and/or computer network, by pooling processing power of two or more networked processors.

As used herein, the terms "comprises", "comprising", "includes", "including", "has", "having", or any other variation thereof, are intended to be non-exclusive inclusions. For example, a process, method, article, or apparatus that comprises a set of elements is not limited to only those elements but may include other elements not expressly listed or even inherent to such process, method, article, or apparatus.

As used in the instant disclosure, the terms "provide", "providing", and variations thereof comprise displaying or providing for display a webpage (e.g., roofing webpage) to one or more user terminals interfacing with a computer and/or computer network(s) and/or allowing the one or more user terminal(s) to participate, such as by interacting with one or more mechanisms on a webpage (e.g., roofing webpage) by sending and/or receiving signals (e.g., digital, optical, and/or the like) via a computer network interface (e.g., Ethernet port, TCP/IP port, optical port, cable modem, and combinations thereof). A user may be provided with a web page in a web browser, or in a software application, for example.

As used herein, the term "structure request", "structure order", "flight plan request", "flight plan order", and any variations thereof may comprise a feature of the graphical user interface or a feature of a software application, allowing a user to indicate to a host system that the user wishes to place an order, such as by interfacing with the host system over a computer network and exchanging signals (e.g., digital, optical, and/or the like), with the host system using a network protocol, for example. Such mechanism may be implemented with computer executable code executed by one or more processors, for example, with a button, a hyperlink, an icon, a clickable symbol, and/or combinations thereof, that may be activated by a user terminal interfacing with the at least one processor over a computer network, for example.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, the use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearance of the phrase "in one embodiment" in various places in the specification are not necessarily all referring to the same embodiment.

Figure 2:
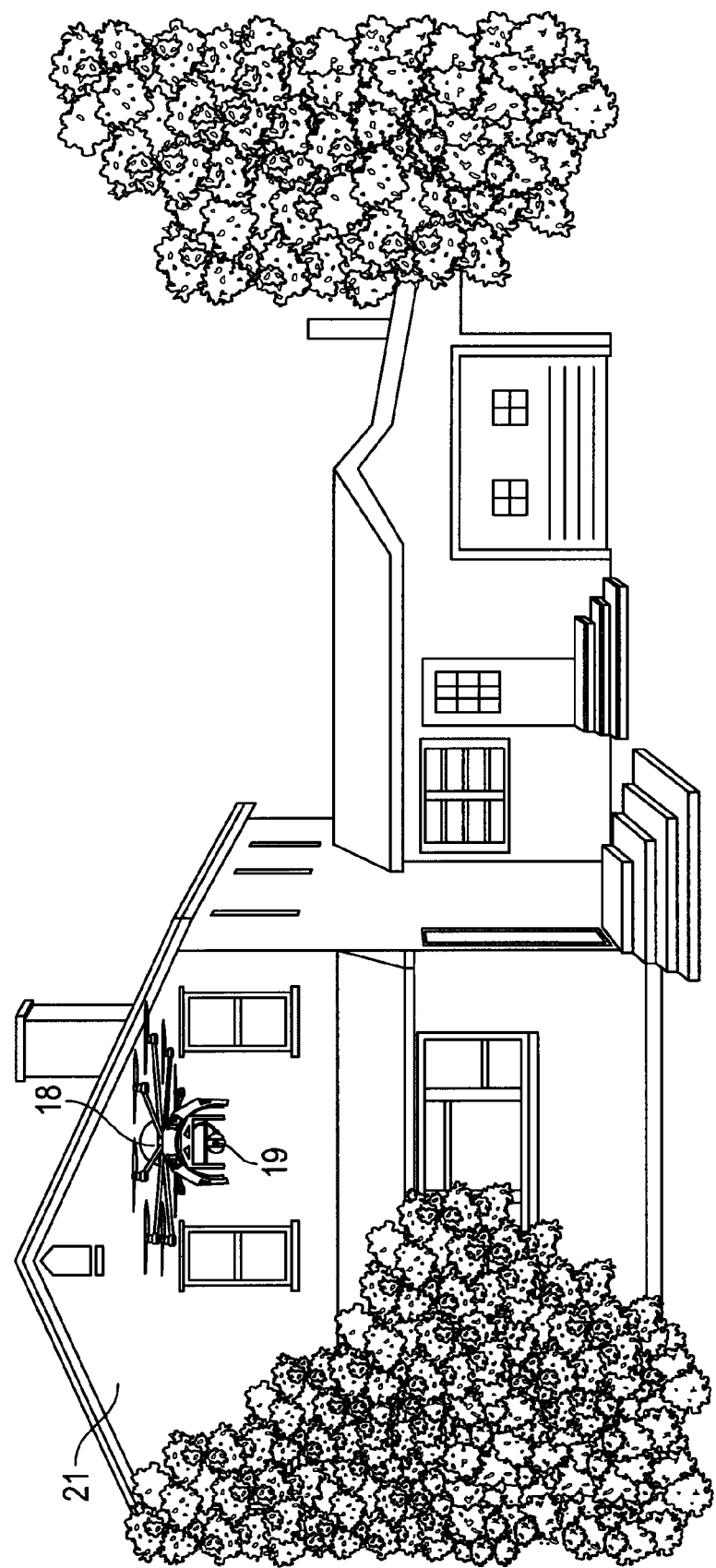
FIG. 2 is an image of an unmanned aircraft with a camera positioned about a structure of interest.

Referring now to FIGS. 1 and 2, shown therein is an exemplary embodiment of an unmanned aircraft structure evaluation system 10 according to the instant disclosure. The unmanned aircraft structure evaluation system 10 comprises one or more host systems 12 interfacing and/or communicating with one or more user terminals 14 via a network 16. Generally, the one or more host systems 12 receive identification information relating to a structure of interest 21 (e.g., building) via the user terminals 14, and data indicative of the geographic positions of the structure. Using the identification information and the geographic positioning of the structure of interest 21, the one or more host systems 12 may generate unmanned aircraft information including flight path information, camera control information, and/or gimbal control information. The unmanned aircraft information may be used by an unmanned aircraft 18 to capture one or more aerial images (e.g., oblique images) of the structure of interest 21. In some embodiments, the flight path information, camera control information, and/or gimbal control information may be determined automatically by analyzing and using geo-referenced images. As such, manual manipulation and/or analysis by a user may be minimized and/or eliminated. In other embodiments, the flight path information, camera control information and/or gimbal control information may be determined with the aid of a user who supplies data by clicking on one or more displayed oblique image of the structure of interest 21 and/or otherwise inputs data into one or more of the user terminals 14.

The structure of interest 21 may be a man-made structure, such as a building. For example, in FIG. 2, the structure of interest 21 is a residential building. Alternatively, the structure may be a naturally occurring structure, such as a tree, for example.

The unmanned aircraft 18 may be any type of unmanned aerial vehicle that can be controlled by using a flight plan. Flight of the unmanned aircraft 18 may be controlled autonomously as described in further detail herein. In some embodiments, flight may be controlled using a flight plan in combination with piloting by a user located on the ground. An exemplary unmanned aircraft 18 may include the Professional SR100 UAC Camera Drone manufactured and distributed by Cadence Technology located in Singapore.

Generally, the unmanned aircraft 18 may include one or more cameras 19 configured to provide aerial images. In some embodiments, the camera 19 may be mounted on a gimbal support (e.g., three-axis gimbal). Additionally, in some embodiments, the unmanned aircraft 18 may include one or more global positioning system (GPS) receivers, one or more inertial navigation units (INU), one or more clocks, one or more gyroscopes, one or more compasses, one or more altimeters, and/or the like so that the position and orientation of the unmanned aircraft 18 at specific instances of time can be monitored, recorded and/or stored with and/or correlated with particular images.

The one or more cameras 19 may be capable of capturing images photographically and/or electronically as well as recording the time at which particular images are captured. In one embodiment, this can be accomplished by sending a signal to a processor (that receives time signals from the GPS) each time an image is captured. The one or more cameras 19 may include, but are not limited to, conventional cameras, digital cameras, digital sensors, charge-coupled devices, and/or the like. In some embodiments, one or more cameras 19 may be ultra-high resolution cameras.

The one or more cameras 19 may include known or determinable characteristics including, but not limited to, focal length, sensor size, aspect ratio, radial and other distortion terms, principal point offset, pixel pitch, alignment, and/or the like.

Referring to FIG. 1, the unmanned aircraft 18 may communicate with the one or more user terminals 14. The one or more user terminals 14 may be implemented as a personal computer, a handheld computer, a smart phone, a wearable computer, network-capable TV set, TV set-top box, a tablet, an e-book reader, a laptop computer, a desktop computer, a network-capable handheld device, a video game console, a server, a digital video recorder, a DVD-player, a Blu-Ray player and combinations thereof, for example. In an exemplary embodiment, the user terminal 14 may comprise an input unit 20, a display unit 22, a processor (not shown) capable of interfacing with the network 16, processor executable code (not shown), and a web browser capable of accessing a website and/or communicating information and/or data over a network, such as the network 16. As will be understood by persons of ordinary skill in the art, the one or more user terminals 14 may comprise one or more non-transient memories comprising processor executable code and/or software applications, for example.

The input unit 20 may be capable of receiving information input from a user and/or other processor(s), and transmitting such information to the user terminal 14 and/or to the one or more host systems 12. The input unit 20 may be implemented as a keyboard, a touchscreen, a mouse, a trackball, a microphone, a fingerprint reader, an infrared port, a slide-out keyboard, a flip-out keyboard, a cell phone, a PDA, a video game controller, a remote control, a fax machine, a network interface, and combinations thereof, for example. In some embodiments, the user terminal 14 is loaded with flight management software for controlling the unmanned aircraft 18.

The display unit 22 may output information in a form perceivable by a user and/or other processor(s). For example, the display unit 22 may be a server, a computer monitor, a screen, a touchscreen, a speaker, a website, a TV set, a smart phone, a PDA, a cell phone, a fax machine, a printer, a laptop computer, a wearable display, and/or combinations thereof. It is to be understood that in some exemplary embodiments, the input unit 20 and the display unit 22 may be implemented as a single device, such as, for example, a touchscreen or a tablet. It is to be further understood that as used herein the term user is not limited to a human being, and may comprise a computer, a server, a website, a processor, a network interface, a human, a user terminal, a virtual computer, and combinations thereof, for example.

As discussed above, the system 10 may include one or more host systems 12. The one or more host systems 12 may be partially or completely network-based or cloud based, and not necessarily located in a single physical location. Each of the host systems 12 may further be capable of interfacing and/or communicating with the one or more user terminals 14 via the network 16, such as by exchanging signals (e.g., digital, optical, and/or the like) via one or more ports (e.g., physical or virtual) using a network protocol, for example. Additionally, each host system 12 may be capable of interfacing and/or communicating with other host systems directly and/or via the network 16, such as by exchanging signals (e.g., digital, optical, and/or the like) via one or more ports.

It should be noted that multiple host systems 12 may be independently controlled by separate entities. For example, in some embodiments, system 10 may include two host systems 12 with a first host system controlled by a first company and a second host system controlled by a second company distinct from the first company.

The one or more host systems 12 may comprise one or more processors 24 working together, or independently to, execute processor executable code, one or more memories 26 capable of storing processor executable code, one or more input devices 28, and one or more output devices 30. Each element of the one or more host systems 12 may be partially or completely network-based or cloud-based, and not necessarily located in a single physical location. Additionally, in embodiments having multiple host systems 12, each host system may directly communicate with additional host systems and/or third party systems via the network 16.

The one or more processors 24 may be implemented as a single or plurality of processors 24 working together, or independently to execute the logic as described herein. Exemplary embodiments of the one or more processors 24 include a digital signal processor (DSP), a central processing unit (CPU), a field programmable gate array (FPGA), a microprocessor, a multi-core processor, and/or combinations thereof. The one or more processors 24 may be capable of communicating with the one or more memories 26 via a path (e.g., data bus). The one or more processors 24 may be capable of communicating with the input devices 28 and the output devices 30.

The one or more processors 24 may be further capable of interfacing and/or communicating with the one or more user terminals 14 and/or unmanned aircraft 18 via the network 16. For example, the one or more processors 24 may be capable of communicating via the network 16 by exchanging signals (e.g., digital, optical, and/or the like) via one or more physical or virtual ports (i.e., communication ports) using a network protocol. It is to be understood that in certain embodiments using more than one processor 24, the one or more processors 24 may be located remotely from one another, located in the same location, or comprising a unitary multi-core processor (not shown). The one or more processors 24 may be capable of reading and/or executing processor executable code and/or of creating, manipulating, altering, and/or storing computer data structures into one or more memories 26.

The one or more memories 26 may be capable of storing processor executable code. Additionally, the one or more memories 26 may be implemented as a conventional non-transient memory, such as, for example, random access memory (RAM), a CD-ROM, a hard drive, a solid state drive, a flash drive, a memory card, a DVD-ROM, a floppy disk, an optical drive, and/or combinations thereof. It is to be understood that while one or more memories 26 may be located in the same physical location as the host system 12, the one or more memories 26 may be located remotely from the host system 12, and may communicate with the one or more processor 24 via the network 16. Additionally, when more than one memory 26 is used, a first memory may be located in the same physical location as the host system 12, and additional memories 26 may be located in a remote physical location from the host system 12. The physical location(s) of the one or more memories 26 may be varied. Additionally, one or more memories 26 may be implemented as a "cloud memory" (i.e., one or more memory 26 may be partially or completely based on or accessed using the network 16).

The one or more input devices 28 may transmit data to the processors 24, and may be implemented as a keyboard, a mouse, a touchscreen, a camera, a cellular phone, a tablet, a smart phone, a PDA, a microphone, a network adapter, a wearable computer and/or combinations thereof. The input devices 28 may be located in the same physical location as the host system 12, or may be remotely located and/or partially or completely network-based.

The one or more output devices 30 may transmit information from the processor 24 to a user, such that the information may be perceived by the user. For example, the output devices 30 may be implemented as a server, a computer monitor, a cell phone, a tablet, a speaker, a website, a PDA, a fax, a printer, a projector, a laptop monitor, a wearable display and/or combinations thereof. The output device 30 may be physically co-located with the host system 12, or may be located remotely from the host system 12, and may be partially or completely network based (e.g., website). As used herein, the term "user" is not limited to a human, and may comprise a human, a computer, a host system, a smart phone, a tablet, and/or combinations thereof, for example.

The network 16 may permit bi-directional communication of information and/or data between the one or more host systems 12, the user terminals 14 and/or the unmanned aircraft 18. The network 16 may interface with the one or more host systems 12, the user terminals 14, and the unmanned aircraft 18 in a variety of ways. In some embodiments, the one or more host systems 12, the user terminals 14 and/or the unmanned aircraft 18 may communicate via a communication port. For example, the network 16 may interface by optical and/or electronic interfaces, and/or may use a plurality of network topographies and/or protocols including, but not limited to, Ethernet, TCP/IP, circuit switched paths, and/or combinations thereof. For example, the network 16 may be implemented as the World Wide Web (or Internet), a local area network (LAN), a wide area network (WAN), a metropolitan network, a wireless network, a cellular network, a GSM-network, a CDMA network, a 3G network, a 4G network, a satellite network, a radio network, an optical network, a cable network, a public switched telephone network, an Ethernet network, and/or combinations thereof. Additionally, the network 16 may use a variety of network protocols to permit bi-directional interface and/or communication of data and/or information between the one or more host systems 12, the one or more user terminals 14 and/or the unmanned aircraft 18.

In some embodiments, the one or more host systems 12, the user terminals 14, and/or the unmanned aircraft 18 may communicate by using a non-transitory computer readable medium. For example, data obtained from the user terminal 14 may be stored on a USB flash drive. The USB flash drive may be transferred to and received by the unmanned aircraft 18 thereby communicating information, such as the unmanned aircraft information including flight path information, camera control information, and/or gimbal control information from the user terminal 14 to the unmanned aircraft 18. The USB flash drive may also be used to transfer images captured by the camera 19, position, orientation and time date to the user terminal(s) 14.

Referring to FIGS. 1 and 2, the one or more memories 26 may store processor executable code and/or information comprising a structure database 32, one or more images databases 34, and program logic 36. The processor executable code may be stored as a data structure, such as a database and/or a data table, for example. In some embodiments, one or more memories of the user terminal 14 may include a structure database 32, one or more image databases 34 and program logic 36 as described in further detail herein.

The structure database 32 may include information (e.g., location, GIS data) about the structure of interest. For example, the structure database 32 may store identification information about the structure including, but not limited to, address, geographic location, latitude/longitude, and/or the like.

The one or more memories 26 may include one or more image databases 34. The one or more image databases 34 may store geo-referenced imagery. Such imagery may be represented by a single pixel map, and/or by a series of tiled pixel maps that when aggregated recreate the image pixel map. Imagery may include nadir, ortho-rectified and/or oblique geo-referenced images. The one or more processors 24 may provide the images via the image database 34 to users at the one or more user terminals 14. In some embodiments, one or more image databases 34 may be included within the user terminals 14.

The one or more memories 26 may further store processor executable code and/or instructions, which may comprise the program logic 36. The program logic 36 may comprise processor executable instructions and/or code, which when executed by the processor 24, may cause the processor 24 to execute image display and analysis software to generate, maintain, provide, and/or host a website providing one or more structure evaluation requests, for example. The program logic 36 may further cause the processor 24 to collect identification information about the structure of interest 21 (e.g., address), allow one or more users to validate a location of the structure, obtain geographical positions of the structure, and the like, as described herein.

Figure 3:
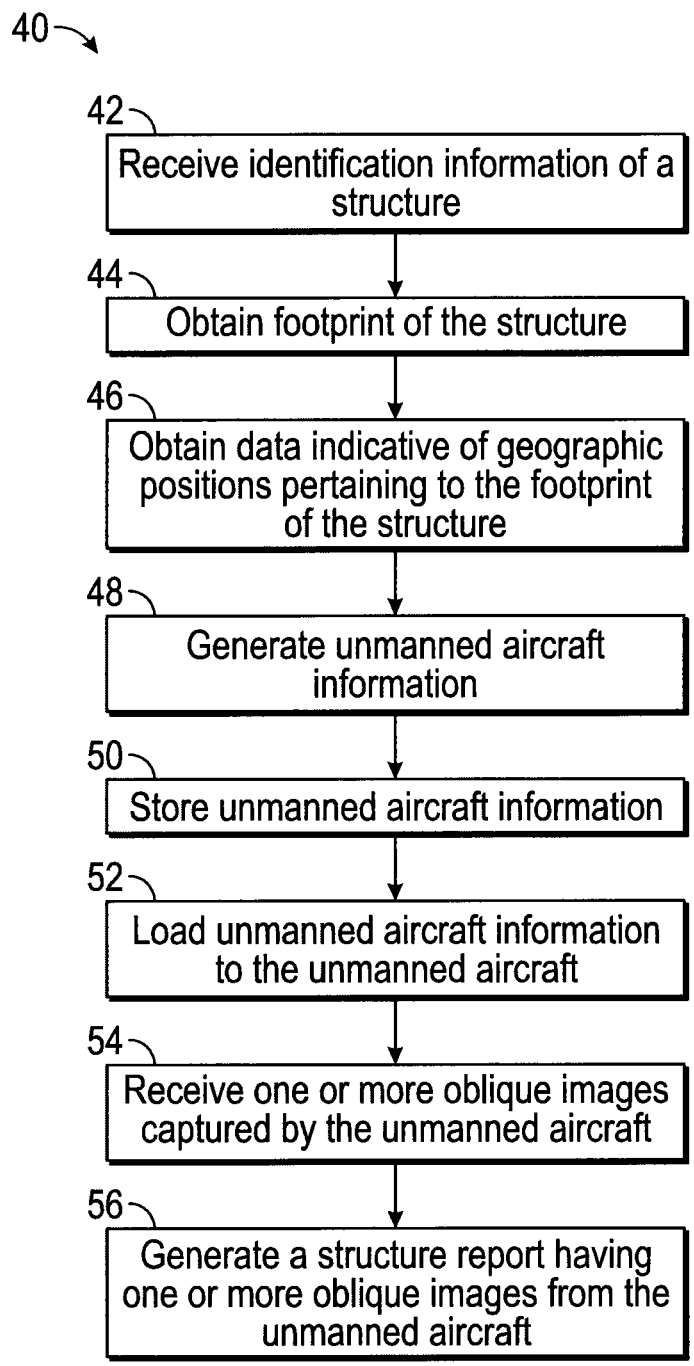
FIG. 3 is a flow chart of an exemplary embodiment of a program logic according to the instant disclosure.

Referring to FIG. 3, shown therein is an exemplary flow chart 40 of program logic 36 for creating a structure evaluation report according to the instant disclosure. Program logic 36 may comprise executable code, which when executed by the one or more processors 24 may cause the one or more processors 24 to execute one or more of the following steps.

In a step 42, the one or more host systems 12 may receive identification information of the structure from the user terminal 14. For example, the one or more host systems 12 may receive the address of the structure, geographic location of the structure (e.g., X, Y, Z coordinates, latitude/longitude coordinates), a location of the user terminal 14 determined by a Geographic Position System (GPS) and/or the like.

Figure 4:
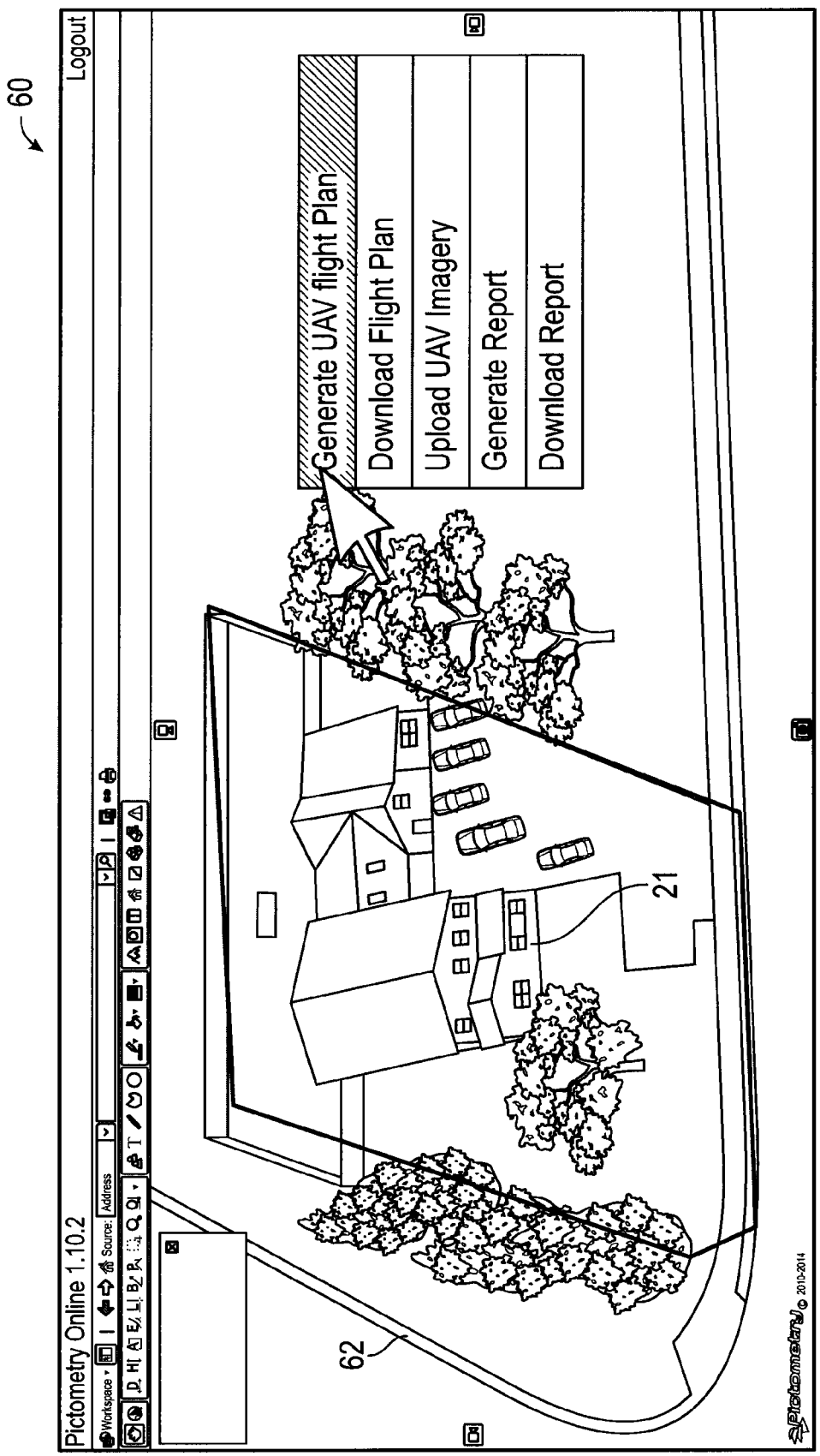
FIG. 4 is an exemplary screen shot of an oblique image of the structure of interest shown in FIG. 2.

In some embodiments, the user may validate the location of the structure of interest 21. One or more processor 24 may provide one or more images via the image database 34 to the display unit 22 of the user terminal 14. For example, FIG. 4 illustrates an exemplary screen shot 60 of an oblique image 62 of the structure of interest 21 that may be displayed on the display unit 22 of the user terminal 14, shown in the block diagram of FIG. 1. The one or more images 62 may be geo-referenced images illustrating portions or all of the structure of interest 21. Referring to FIGS. 1 and 4, the program logic 36 may cause the processor 24 to provide users the one or more geo-referenced images 62 (e.g., via the display unit 22), and allow the user to validate the location of the structure of interest 21 (e.g., via the input unit 20). For example, the user may be able to use a drag-and-drop element provided by the program logic 36 via user terminal 14 to select the structure of interest 21 within the one or more geo-referenced images 62. Selection of the structure of interest 21 within the one or more geo-referenced images 62 may provide one or more validated images and a validated location of the structure of interest. It should be noted, that in some embodiments, the program logic of the user terminal 14, with or in lieu of the program logic 36 of the processor 24, may provide users the one or more geo-referenced images 62 to allow for validation of the location of the structure of interest 21.

In some embodiments, validation of the geo-referenced images may be provided by one or more additional host systems via the one or more processors 24 in lieu of, or in combination with host system 12. For example, the host system 12 may direct the user to a second host system wherein one or more processors of the second host system may provide geo-referenced images 62 from image database to the user for validation of one or more structures of interest 21.

In some embodiments, the geographic location may include coordinates, and validation of the geographic location may be provided by the user by altering one or more coordinates of the geographic location. Users may alter the one or more coordinates by methods including, but not limited to, manual manipulation, drag-and-drop elements, and the like.

In some embodiments, location of the structure of interest 21 may be automatically determined by location of the user terminal 14. For example, a user may be physically present at the structure of interest 21, and the user may be holding the user terminal 14 which determines its location using any suitable technology, such as GPS. Using location coordinates of the user terminal 14, the location of the structure of interest 21 may be determined.

In a step 44, a footprint of the structure of interest 21 may be determined. The footprint may provide a two-dimensional boundary (e.g., sides) and/or outline of the structure of interest 21. For example, the outline of the structure of interest 21 may be determined using systems and methods including, but not limited to, those described in U.S. Patent Publication No. 2010/0179787, U.S. Patent Publication No. 2010/0110074, U.S. Patent Publication No. 2010/0114537, U.S. Patent Publication No. 2011/0187713, U.S. Pat. No. 8,078,436, and U.S. Ser. No. 12/090,692, all of which are incorporated by reference herein in their entirety. In some embodiments, the footprint of the structure of interest 21 may be provided to the user via the display unit 22. For example, in some embodiments, the footprint of the structure of interest 21 may be displayed as a layer on one or more images (e.g., nadir image) via the display unit 22.

In some embodiments, the one or more processors 24 may provide, via the display unit 22, one or more websites to the user for evaluation of multiple oblique images to provide the footprint of the structure of interest 21. For example, the user and/or the processors 24 may identify edges of the structure of interest 21. Two-dimensional and/or three-dimensional information regarding the edges (e.g., position, orientation, and/or length) may be obtained from the images using user selection of points within the images and the techniques taught in U.S. Pat. No. 7,424,133, and/or stereo-photogrammetry. Using the two-dimensional and/or three-dimensional information (e.g., position orientation, and/or length), line segments may be determined with multiple line segments forming at least a portion of the footprint of the structure of interest 21.

In a step 46, data indicative of geographic positions pertaining to the footprint of the structure of interest 21 and/or structure height information may be obtained. For example, in some embodiments, the height of structure of interest 21 above the ground may be determined. The height of the structure of interest 21 above the ground may aid in determining altitude for the flight plan of the unmanned aircraft 18 as discussed in further detail herein. Measurements of the geographic positions of the structure of interest 21, such as a vertical structure, may include techniques as described in U.S. Pat. No. 7,424,133, which is hereby incorporated herein by reference in its entirety. The term "vertical structures", as used herein includes structures that have at least one portion of one surface that is not fully horizontal. For example, "vertical structures" as described herein includes structures that are fully vertical and structures that are not fully vertical, such as structures that are pitched at an angle and/or that drop into the ground. The side of a structure is not limited to only one or more walls of the structure of interest 21, but may include all visible parts of the structure of interest 21 from one viewpoint. For instance, when the present disclosure is discussing a structure of interest 21, such as a house, a "side" or "vertical side" includes the wall of the house and the roof above the wall up to the highest point on the house.

In some embodiments, more than one height may be used. For example, if the structure of interest 21 is a split-level building having a single story part and a two story part, a first height may be determined for the first story and a second height may be determined for the second story. Altitude for the flight path of the unmanned aircraft 18 may vary based on the differing heights of the structure of interest 21.

In some embodiments, using the input unit 20 and/or the display unit 22, the user may give additional details regarding geographic positions pertaining to the outline of the structure of interest 21 and/or structure height information. For example, if the structure of interest 21 is a roof of a building, the user may include identification of areas such as eaves, drip edges, ridges, and/or the like. Additionally, the user may manually give values for pitch, distance, angle, and/or the like. Alternatively, the one or more processors 24 may evaluate imagery and determine areas including eaves, drip edges, ridges and/or the like without manual input of the user.

In a step 48, using the footprint, height, and possibly additional geographic positions or information pertaining to the structure of interest 21 including the geographic location of obstructions in potential flight paths such as trees and utility wires, unmanned aircraft information may be generated by the one or more host systems 12 and/or the user terminal 14. The unmanned aircraft information may include flight path information, camera control information, and/or gimbal control information.

Figure 6:
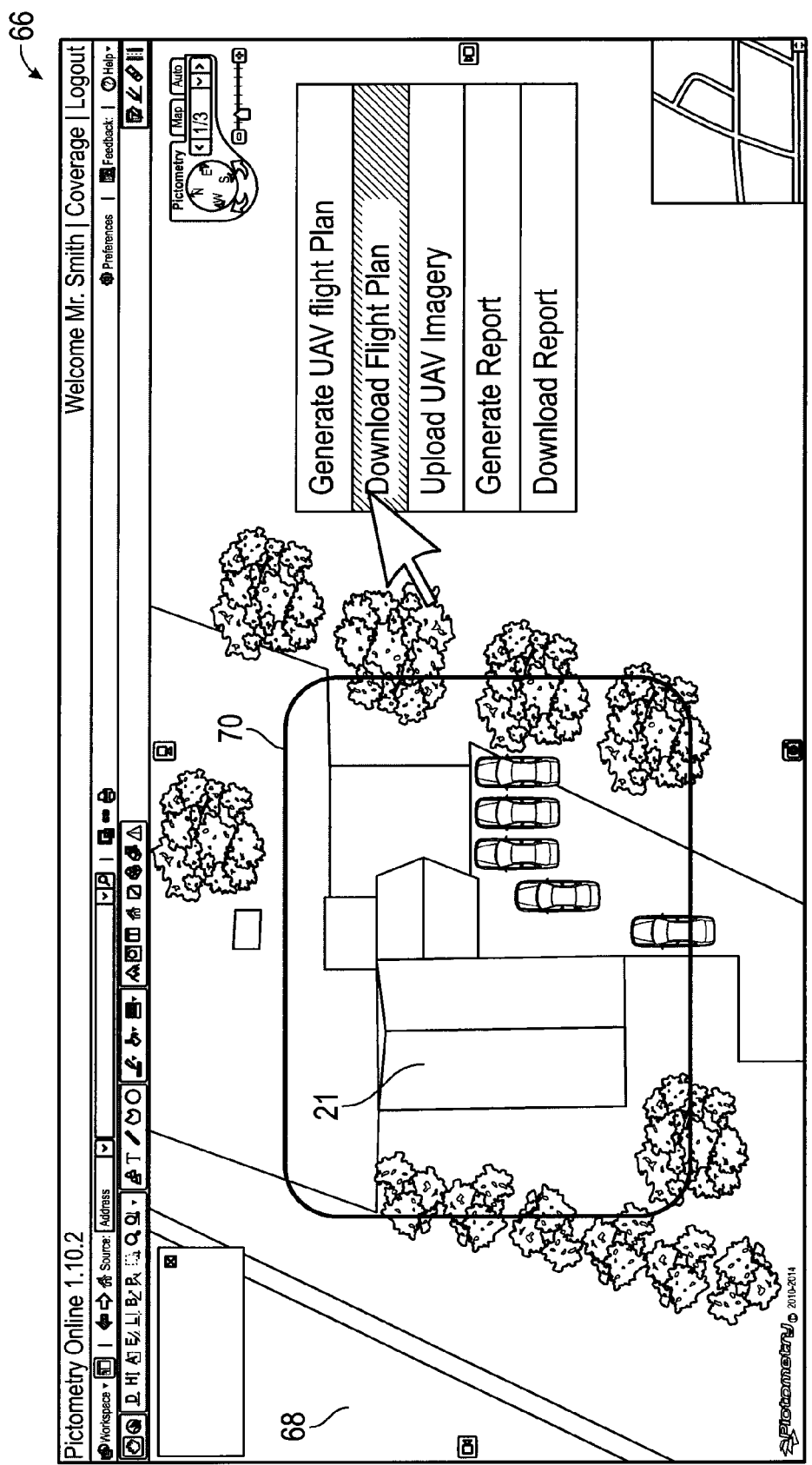
FIG. 6 is an exemplary screen shot of a nadir image of the structure of interest shown in FIG. 4, the screen shot illustrating an exemplary flight plan for an unmanned aircraft.

Flight path information may be configured to direct the unmanned aircraft 18 to fly a flight path around the structure of interest 21. In some embodiments, a flight path may be displayed to the user on one or more images (e.g., nadir, oblique) via the display unit 22. For example, FIG. 6 illustrates an exemplary screen shot 66 of a nadir image 68 showing a flight path 70 about the structure of interest 21. In some embodiments, the flight path 70 may be a displayed as a layer overlapping the nadir image 68 of the structure of interest 21 on the display unit 22 of FIG. 1.

Figure 5:
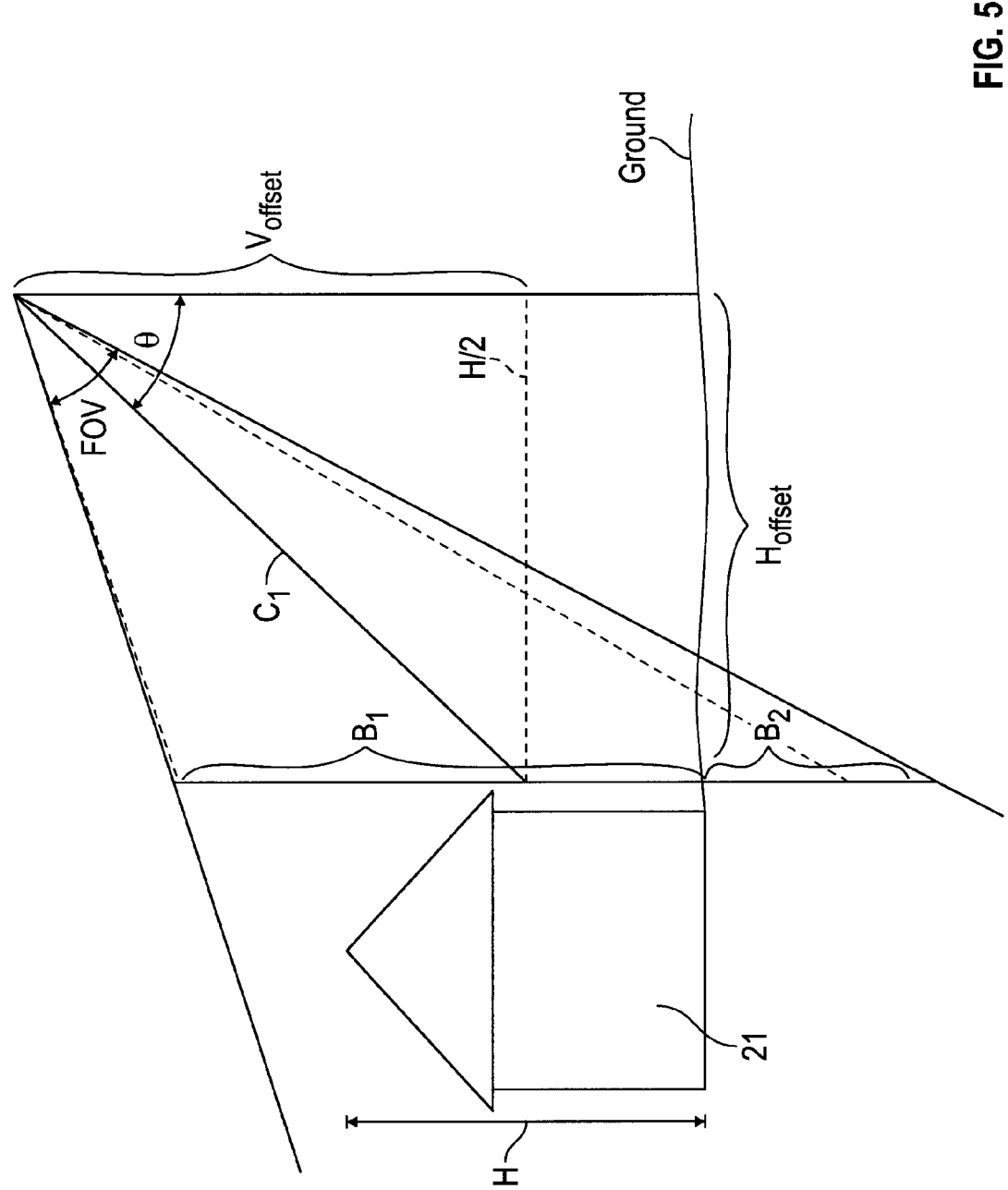
FIG. 5 is an exemplary diagram illustrating lateral and vertical offset of an unmanned aircraft in relation to a structure in accordance with the present disclosure.

Generally, the flight path information directs the unmanned aircraft 18 in three dimensions. Referring to FIGS. 5 and 6, he flight path information may be determined such that the flight path 70 around the structure of interest 21 is laterally and/or vertically offset from the geographic positions of the outline of the structure of interest 21. In particular, lateral offset $L_{OFFSET}$ and vertical offset $V_{OFFSET}$ may be dependent upon the height H of the structure 21, orientation of the camera relative to the unmanned aircraft 18, and characteristics of the camera 19.

Referring to FIG. 5, generally in determining offset from the structure 21, the field of view (FOV) of the camera 19 may be positioned such that a center $C_1$ is at one half the height H of the structure 21, for example. Additionally, one or more buffer regions B may be added to the FOV. Buffer regions B may increase the angle of the FOV by a percentage. For example, buffer regions $B_1$ and $B_2$ illustrated in FIG. 5 may increase the angle of the FOV by 20-50%. To determine the lateral offset $L_{OFFSET}$ and the vertical offset $V_{OFFSET}$ of the camera 19 from the structure 21, a predetermined angle $\Theta$ within a range of 25-75 degrees may be set. Once the angle $\Theta$ is set, the lateral offset $L_{OFFSET}$ and the vertical offset $V_{OFFSET}$ of the camera 19 relative to the structure 21 may be determined using trigonometric principles, for example. For example, lateral offset $L_{OFFSET}$ may be determined based on the following equation:

$$L_{OFFSET} = C_1 * \mathrm{Sin}(\Theta) \qquad (\mathrm{EQ.\ 1})$$

wherein $C_1$ is the centerline of the field of view FOV. The vertical offset $V_{OFFSET}$ may be determined based on the following equation:

$$V_{OFFSET} = C_1 * \mathrm{Cos}(\Theta) \qquad (\mathrm{EQ.\ 2})$$

wherein $C_1$ is the centerline of the field of view FOV.

The flight path information may optionally direct the roll, pitch and yaw of the unmanned aircraft 18. For example, some versions of the unmanned aircraft 18 may not have a multi-axis gimble and as such, can be directed to aim the camera 19 by changing the yaw, pitch or roll of the unmanned aircraft 18. The current yaw, pitch and roll of the unmanned aircraft 18 may be measured using a position and orientation system that is a part of the unmanned aircraft 18. In some embodiments, the position and orientation system may be implemented using microelectromechanical based accelerometers and/or microelectromechanical based gyrometers.

Figure 7:
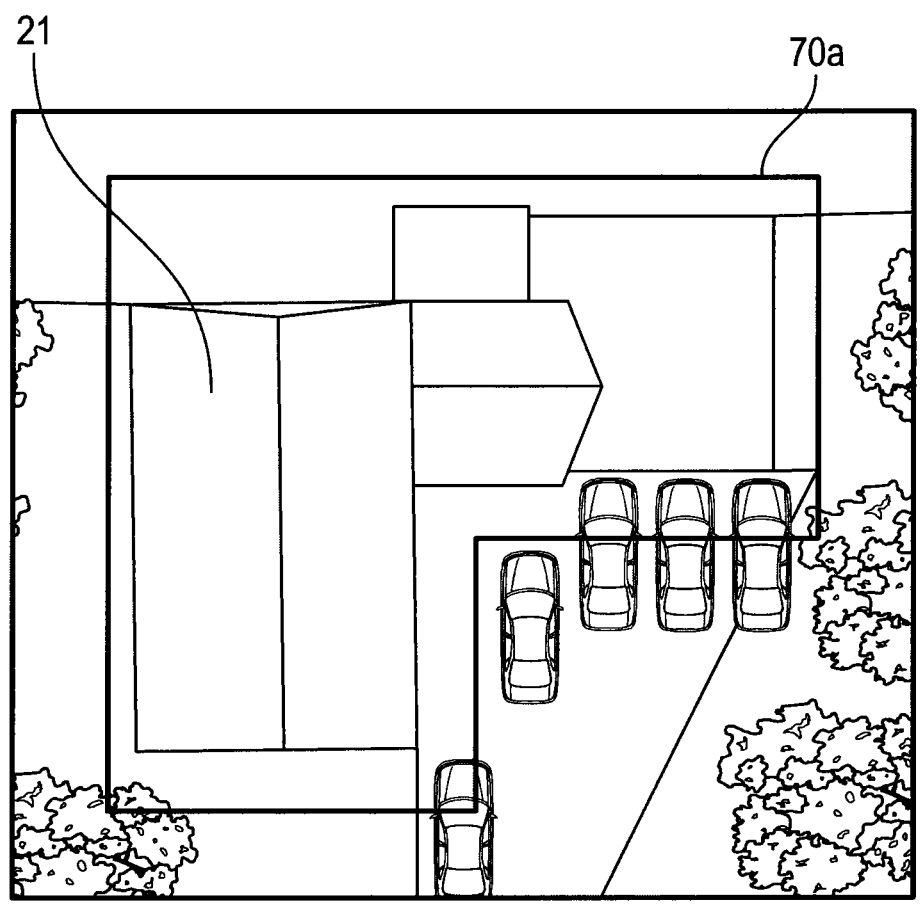
FIG. 7 is another exemplary screen shot of nadir image of the structure shown in FIG. 6, the screen shot illustrating another exemplary flight plan for an unmanned aircraft.

In many cases, there may be obstacles that lie along the flight path. Some of those obstacles may be able to be detected by the system through use of the imagery. In some embodiments, the flight path 70 may be determined such that interference with outside elements (e.g., trees and telephone wires) may be minimized. For example, FIG. 7 illustrates a variation of the flight path 70 determined in FIG. 4 wherein the flight path 70a of FIG. 7 minimizes interference by following the outline of the structure of interest 21.

A ground confidence map, as described in U.S. Pat. No. 8,588,547, which disclosure is hereby incorporated herein by reference, could be used to identify objects for which there is a high degree of confidence that the object lies elevated off of the ground. Auto-correlation and auto-aerial triangulation methods could then be used to determine the heights of these potential obstructions. If the flight path would go through one of these obstructions, it could be flagged and the algorithm could then attempt to find the best solution for getting past the obstructions: either flying closer to the structure of interest 21 as shown in FIG. 7, which might necessitate additional passes due to a finer resolution and therefore smaller path width, or by flying over the obstruction and aiming the camera 19 at a steeper oblique angle, which again may require an adjustment to the flight path to ensure full coverage. For any flight paths that are flagged for possible obstructions, a system operator could validate the corrective route chosen and alter it as necessary.

In addition to those obstacles that are identified within the image, there may also be obstacles that cannot be identified in the image. These could be newer trees or structures that were not in the original images used for flight planning, wires or other objects that may not show up in the images in enough detail to be able to determine their location, or other unexpected obstacles. As such, the unmanned aircraft 18 may also incorporate a collision detection and avoidance system in some embodiments. The collision detection and avoidance system could either be imaging based, or active sensor based. When an obstacle lies along the Flight Path, the software guiding the unmanned aircraft 18 could first attempt to move closer to the structure of interest 21 along the path from the Flight Path to the Target Path. If after a suitable threshold, which may be set at 10% of the distance (104' in the above examples, so 10% being 10.4') so that the 20% overlap still ensures complete coverage, if the unmanned aircraft 18 is unable to bypass the obstacle, the collision detection and avoidance system would steer the unmanned aircraft 18 back to its original point of collision detection and would then attempt to fly above the obstacle.

Since the software controlling the unmanned aircraft 18 keeps the camera 19 aimed at the Target Path, flying higher may still capture the necessary portions of the structure of interest 21; but the oblique down-look angle may change and the resolution may become a bit coarser. In extreme circumstances, the unmanned aircraft 18 may require operator intervention to properly negotiate around the obstacle. In these cases, the software running on a processor of the unmanned aircraft 18 would transmit a signal to the operator in the form of an audible alarm, for example, and allow the operator to steer the unmanned aircraft 18 around the obstacle. As the unmanned aircraft 18 passes the Flight Capture Points, the camera(s) 19 would fire. To ensure this, the Flight Capture Points are not just points, but may be a vertical plane that is perpendicular to the Flight Path and that passes through the Flight Capture Point. Thus, even if the unmanned aircraft 18 is 30' above or away from the Flight Path at the time, as it passes through that plane, and thus over or to the side of the Flight Capture Point, the software controlling the unmanned aircraft 18 would cause the camera 19 to fire.

Figure 8:
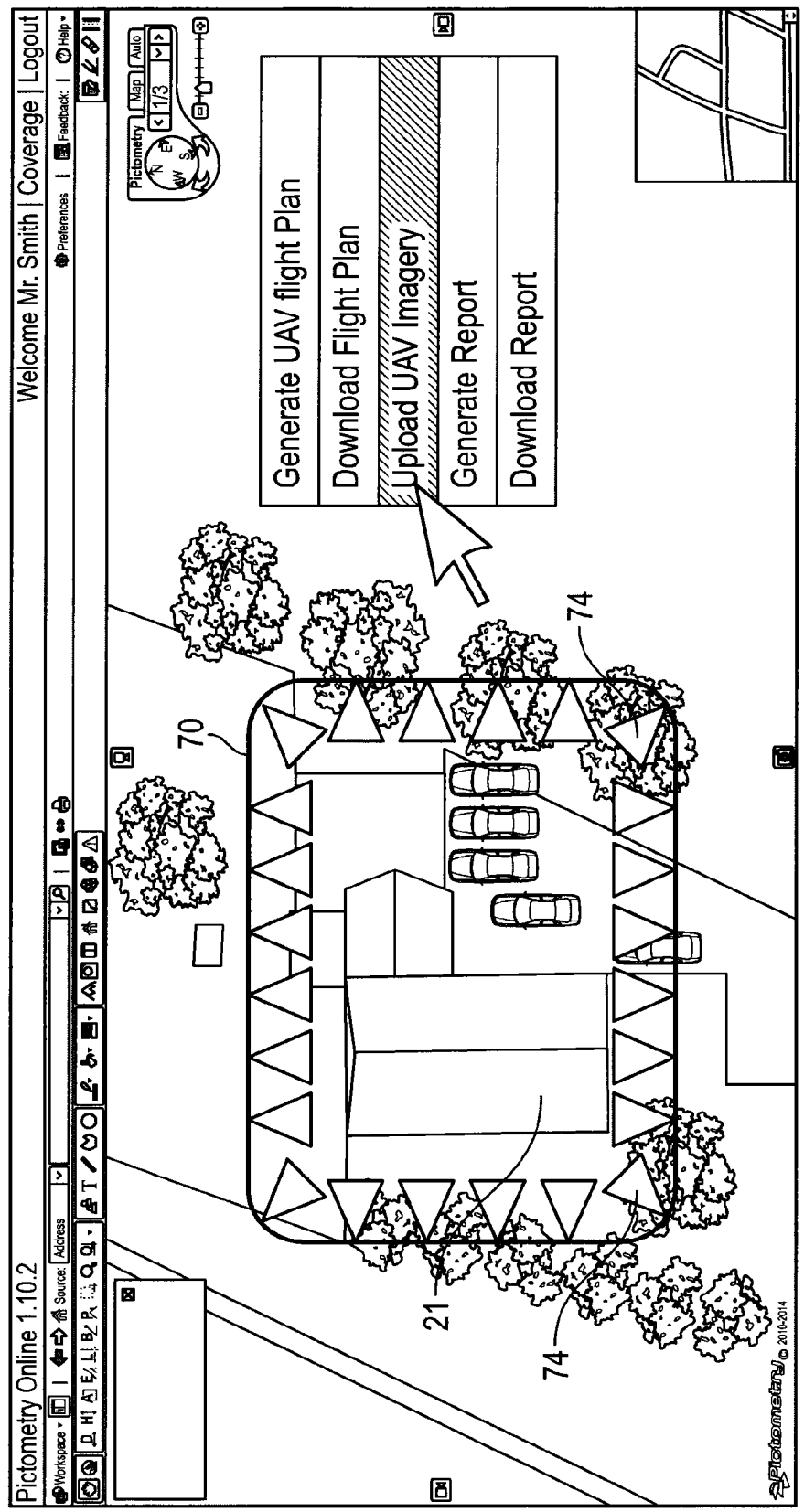
FIG. 8 is an exemplary screen shot of a nadir image of the structure of interest shown in FIG. 4, the screen shot illustrating a camera path of an unmanned aircraft.

The camera control information may be loaded into the software running on the processor of the unmanned aircraft 18 to control actuation of the camera 19 of the unmanned aircraft 18. For example, the camera control information may direct the camera 19 to capture images (e.g., oblique images) at one or more predefined geographic locations 74 (which are referred to herein below as Flight Capture Points), as illustrated in screen shot 72 of FIG. 8. In some embodiments, the camera control information may direct the camera 19 to capture images on a schedule (e.g., periodic, random). Further, the camera control information may control camera parameters including, but not limited to zoom, focal length, exposure control and/or the like.

The gimbal control information may be loaded into the software running on the processor of the unmanned aircraft 18 to control the direction of the camera 19 relative to the structure of interest 21. For example, the gimbal control information may control the orientation of the camera 19 in three dimensions such that during capture of an image, the camera 19 is aligned with a pre-determined location on the structure of interest 21 that are referred to below as Target Capture Points.

In a step 50, the unmanned aircraft information may be stored on one or more non-transitory computer readable medium of the host system 12 and/or user terminal 14. For example, in some embodiments, the host system 12 may determine the unmanned aircraft information, communicate the unmanned aircraft information to the user terminal 14 via the network 16, such that the unmanned aircraft information may be stored on one or more non-transitory computer readable medium. Alternatively, the user terminal 14 may determine the unmanned aircraft information and store the unmanned aircraft information on one or more non-transitory computer readable medium. In some embodiments, the one or more non-transitory computer readable medium may include a USB flash drive or other similar data storage device.

In a step 52, the unmanned aircraft information may be loaded onto the unmanned aircraft 18. For example, the unmanned aircraft information may then be loaded onto the unmanned aircraft 18 via transfer of the non-transitory computer readable medium (e.g., USB flash drive) from the user terminal 14. It should be noted that the unmanned aircraft information may be loaded and/or stored onto the unmanned aircraft 18 by any communication, including communication via the network 16.

The unmanned aircraft 18 may use the unmanned aircraft information to capture one or more oblique images of the structure of interest 21. Generally, the unmanned aircraft 18 may follow the flight path within the unmanned aircraft information obtaining the one or more oblique images as set out within the camera control information and gimbal control information. In some embodiments, a user may manually manipulate the flight path 70 of the unmanned aircraft information during flight of the unmanned aircraft 18. For example, the user may request the unmanned aircraft 18 to add an additional flight path 70 or repeat the same flight path 70 to obtain additional images.

In a step 54, the one or more processors 24 may receive one or more oblique images captured by the unmanned aircraft 18. The flight path information, camera control information and gimbal control information may direct the unmanned aircraft 18 to capture one or more oblique images at predetermined locations and times as described herein. The one or more oblique images may be communicated to the one or more processors 24 via the network and/or stored one or more non-transitory computer readable medium. The one or more oblique images may be stored in one or more image database 34. In some embodiments, the one or more oblique images may be communicated to the user terminal 14, and the user terminal 14 may communicate the images to the one or more processors 24.

In a step 56, the one or more processors 24 may generate a structure report. The program logic 36 may provide for one or more user terminals 14 interfacing with the processor 24 over the network 16 to provide one or more structure report website pages allowing users to view the structure report. For example, FIG. 9 illustrates an exemplary screen shot 76 of a structure report 78 on the display unit 22 of a user terminal 14.

One or more images 80 obtained from the camera 19 of the unmanned aircraft 18 may be used for evaluation of the structure of interest 21 for the structure report 78. For example, if the structure of interest 21 is a building, the images obtained from the camera 19 may be used in an insurance evaluation (e.g., flood damage, hail damage, tornado damage).

One or more images 80 obtained from the camera may be provided in the structure report 78. For example, the structure report 78 in FIG. 9 includes an image data set 82. The image data set 82 may include nadir and/or oblique images 80 of the structure of interest 21. Additionally, the image data set 82 may include one or more images 80 of objects of interest on and/or within the structure of interest 21. For example, if the structure report 78 details damage to a roof of the structure of interest 21, one or more images 80 of damage to the roof may be included within the image data set 82. In some embodiments, third party images of the structure of interest 21 may be included within the structure report 78.

Figure 9:
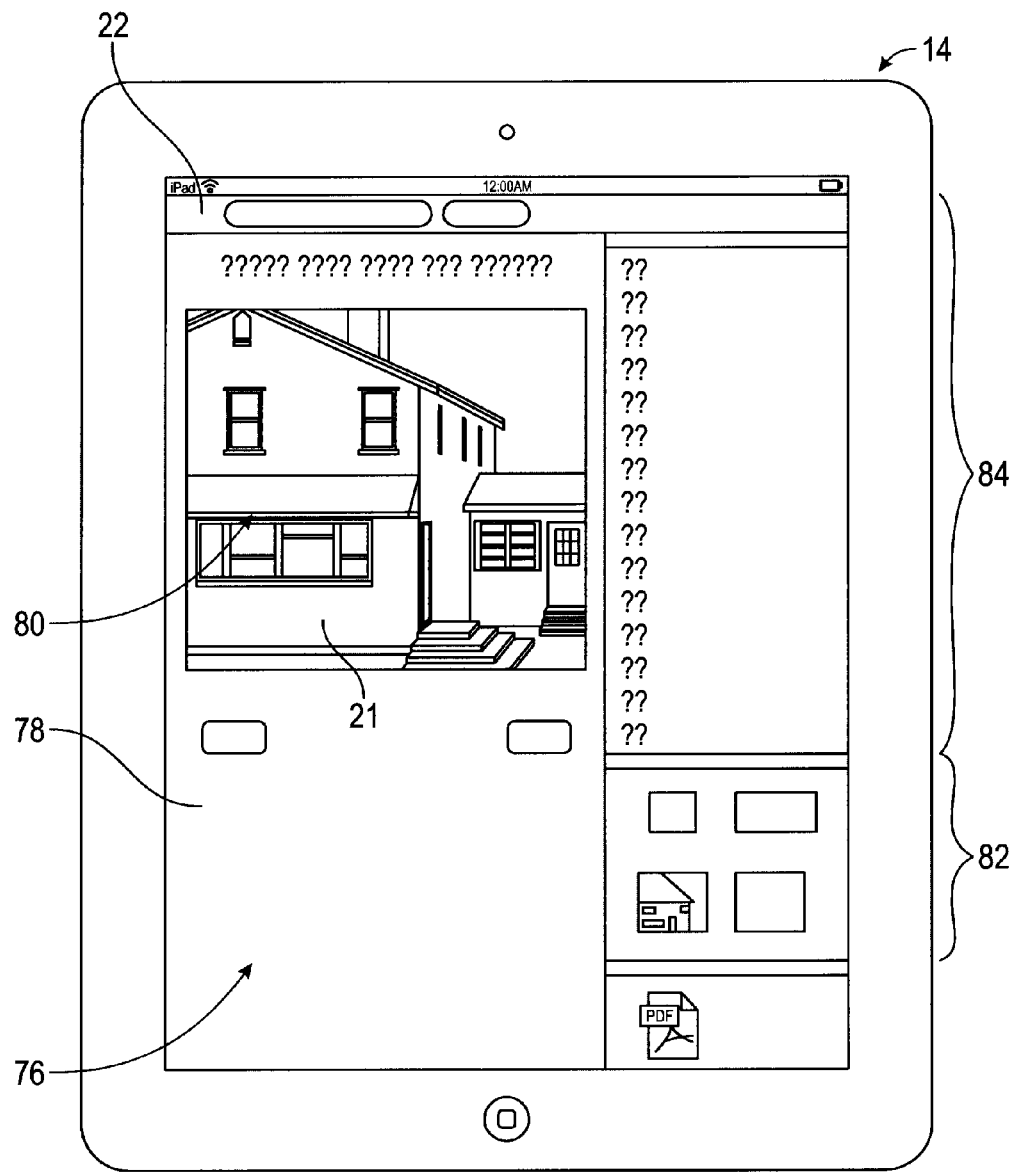
FIG. 9 is an exemplary screen shot of a structure report displayed on a display unit of a user terminal.
Figure 10:
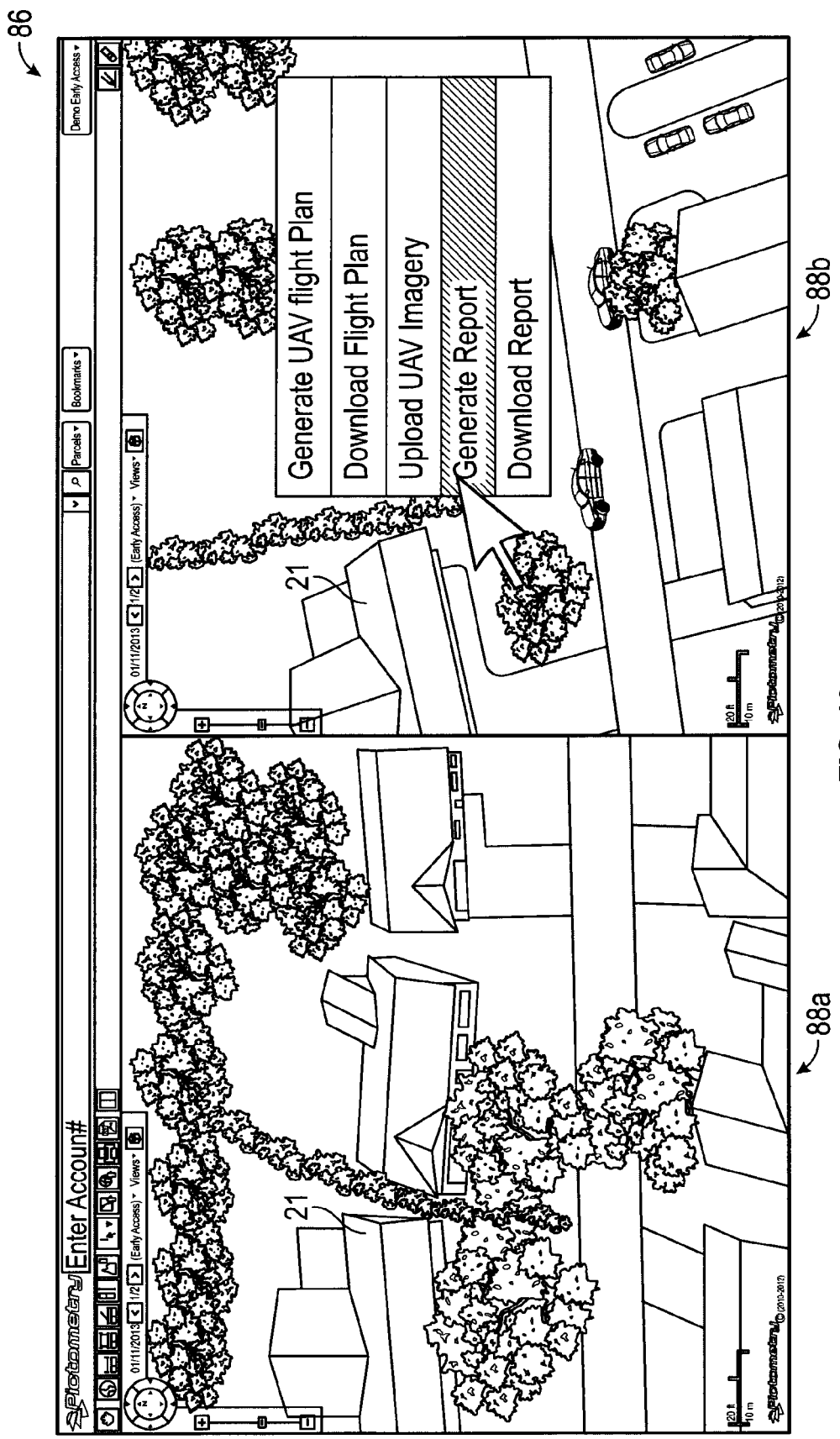
FIG. 10 is an exemplary screen shot of two oblique images of a structure, each oblique image showing the structure at a distinct time period.

Structural details may be provided in the structure report 78 within a structure data set 84 as illustrated in FIG. 9. The structure data set 84 may include information related to structure of interest 21 including, but not limited to, area of the structure of interest 21 (e.g., square feet), roof details (e.g., pitch, ridge length, valley length, eave length, rake length), height of the structure of interest 21, and/or the like. Additionally, the structure data set 84 may include order information for the structure report 78. For example, the structure data set 84 may include information regarding the time an order for the structure report 78 was placed, the time the order for the structure report 78 was completed, the delivery mechanism for the structure report 78, the price of the order for the structure report 78, and/or the like, for example.

Based on the flight path information, camera control information, and gimbal control information, during image capture, the location of the camera 19 relative to the structure of interest 21 for images captured may also be known. For example, in some embodiments, the X, Y, Z location (e.g., latitude, longitude, and altitude) of a location seen within each image may be determined. The information may be used to further evaluate objects on and/or within the structure of interest 21. In some embodiments, images 80 captured by the unmanned aircraft 18 may be used to generate a two or three-dimensional model of the structure of interest 21.

The unmanned aircraft structure evaluation system 10 may be used as follows.

An insurance adjustor or other field operator would arrive at the house being assessed for damage or for underwriting. He would go to an online application on a portable networked computer device (e.g., user terminal 14), such as a tablet, smart phone, or laptop, and select the property and structure of interest 21. This selection could be done with identification information, such as a GPS determining his current location, through entering a street address into the search bar, through entering the geographic location into the user terminal 14, through scrolling on a map or aerial image displayed on the user terminal 14 of the current location, or through a preselected target property made by virtually any method that results in finding the property and storing it for later retrieval.

Once the location is found, an image or 3-D Model for that property and structure of interest 21 is displayed on the screen. An oblique image, or a street side image, would provide more information to the operator for property verification as traditional orthogonal images do not include any portion of the side of the image. The 3D model (which may be textured with an oblique or street side image) would work as well. The operator verifies that the property and structure of interest 21 on the screen matches the property and structure of interest 21 that he is standing in front of to ensure that the operator generates the proper report.

The operator then clicks on the structure of interest 21 and requests a flight plan for that structure of interest 21. Software, running on either or both of the user terminal 14 and the host system 12 then isolates the structure of interest 21 and generates an outline as described above. The software also causes the user terminal 14 system to determine the height H of the structure, either by using an automated method, or by having the operator use a height tool on the oblique image, such as through the method described in U.S. Pat. No. 7,424,133. This height H is then used to automatically determine the proper flying height, lateral offset $L_{OFFSET}$, and vertical offset $V_{OFFSET}$ offset for the flight path for the unmanned aircraft 18 (which may be an unmanned aerial system). The height H may also be used to aim the steerable camera 19 carried by the unmanned aircraft 18.

In this embodiment, first, a "Target Path" is generated that follows the path of the perimeter of the structure 21 and that is at a height over ground such that a center $C_1$ of the field of view may be located at one-half the height of the structure of interest 21 as illustrated in FIG. 5. Thus, if it is a two-and-a-half story structure of 28' height, the Target Path would be generated such that the center $C_1$ of the field of view may be at 14' height over ground. Although, it should be understood that the height over ground does not have to place the center $C_1$ of the field of view to be one-half the height of the structure of interest 21 and can vary.

Next, characteristics of the camera 19 may be used, such as, for example, the desired effective resolution of the image as well as the overall sensor size of the camera 19 onboard the unmanned aircraft 18, to determine the maximum vertical swath width that may be captured on a single pass. So, for instance, if the desired effective image resolution is ¼" GSD, and the sensor has 4,000 pixels in the vertical orientation, then the maximum vertical swath width would be 1,000" or 125'. A significant buffer B may be subtracted out to allow for position and orientation errors when flying, for buffeting due to wind, and for absolute position errors in the reference imagery. The size of the buffer B can vary, but can be about a 20% buffer on all sides of the imagery. As such, in this example, the maximum vertical swath width would be 75'. If the structure of interest 21 has a greater height H than this, then the structure of interest 21 may need to be captured in multiple passes. If so, using the same example numbers above, the first pass would be captured at 37.5' above ground, the second at 112.5' above ground, the third at 187.5' above ground, and so on until the entire structure of interest 21 is covered.

If the structure of interest 21 is smaller than the maximum vertical swath width, then the resolution can be increased beyond the desired effective image resolution. So in the above example of the two-and-a-half story house, the resolution could be switched to ⅛" which would yield a maximum swath width of 37.5' which is more than sufficient to cover the 28' of structure height while still including the 20% buffer B on all sides.

Once the effective image resolution has been determined, the lateral offset $L_{OFFSET}$ and vertical offset $V_{OFFSET}$ can then be determined by calculating the path length that achieves the determined resolution. For instance, with a 5-micron sensor pitch size and a 50-mm lens, the path length would be 104'. If the desired imagery is to be captured at a $\Theta$ of 40-degrees (an angle from 40-degrees to 50-degrees down from horizontal is typically optimal for oblique aerial imagery) then that translates to a lateral offset $L_{OFFSET}$ of 79.6' stand-off distance (cosine of 40×104') and a vertical offset $V_{OFFSET}$ of 66.8' vertical height adjustment (sine of 40×104').

Using the Target Path as a starting point, the path would now be grown by the requisite lateral offset $L_{OFFSET}$ and vertical offset $V_{OFFSET}$ distance using standard geometry or morphological operators to create the Flight Path. For instance, if the target path were a perfect circle, the radius would be extended by the 79.6' lateral offset $L_{OFFSET}$ distance. If the target path were a rectangle, each side would be extended outward by the 79.6' lateral offset $L_{OFFSET}$ distance. The flying altitude for the Flight Path would be determined by adding the vertical offset $V_{OFFSET}$ distance to the height of the Target Path and then adding that to the ground elevation for the starting point of the flight path. So in the example of the 28' house, the flight altitude would be the sum of the 14' Target Path height over ground, the 66.8' vertical offset $V_{OFFSET}$ for the desired resolution, and the base elevation at the start, which for this example will be 280' above ellipsoid. Thus, the resulting flight height would be 360.8' above ellipsoid.

Ellipsoidal heights are used by GPS-based systems. If the elevation data available, such as an industry standard Digital Elevation Model or as the Tessellated Ground Plane information contained in the oblique images, as described in U.S. Pat. No. 7,424,133, is defined in mean sea level, the geoidal separation value for that area can be backed out to get to an ellipsoidal height, as is a well-known photogrammetric practice. From a software stand-point, a software library such as is available from Blue Marble Geo can be used to perform this conversion automatically.

Next, the software would determine Target Capture Points of the camera control information. The Target Capture Points may be spaced along the Target Path in such a manner as to ensure full coverage of the vertical structure of interest 21. This would be determined using a similar method as was done with the maximum vertical swath width. Once the desired resolution is known, it is multiplied by the number of pixels in the horizontal orientation of the sensor of the camera 19, and then sufficient overlap is subtracted. Using the above example, if there are 3,000 pixels in the sensor of the camera 19 in the horizontal orientation and the software uses the same 20% overlap and ⅛" GSD effective image resolution that is discussed above, then a suitable spacing distance for the Target Capture Points would be 18.75'. Thus, an arbitrary start point would be selected (typically a corner along the front wall is used) and then going in an arbitrary direction, a Target Capture Point would be placed on the Target Path every 18.75' as well as one at the next corner if it occurs before a full increment. A Target Capture Point may then be placed on the start of the next segment along the Target Path and this pattern may be repeated until all the segments have Target Capture Points.

Once all the Target Capture Points have been determined, the Target Capture Points can be projected onto the Flight Path to create Flight Capture Points. This projection may be accomplished by extending a line outward from that is perpendicular to the Target Path and finding where it intersects the Flight Path. This has the effect of applying the lateral offset $L_{OFFSET}$ distance and vertical offset $V_{OFFSET}$ calculated earlier. These Flight Capture Points are then used to fire the camera 19 as the unmanned aircraft 18 passes by the Flight Capture Points. When doing so, the unmanned aircraft 18 keeps the camera aimed at the respective Target Capture Point. This aiming can be accomplished by a number of methods, such as an unmanned aircraft 18 that can turn, but is best accomplished with a computer controlled gimbal mount for the camera 19.

Alternatively, the camera 19 on the unmanned aircraft 18 could be put into "full motion video mode" whereby continuous images are captured at a high rate of speed (typically greater than 1 frame per second up to and even beyond 30 frames per second). Capturing at high frame rates ensures sufficient overlap. However, capturing at high frame rates also results in a much greater amount of image data than is needed which means longer upload times. In addition, many cameras 19 can capture higher resolution imagery in "still frame video" mode versus "full motion video" mode. But while still frame video mode is preferred from a resolution and data transfer standpoint, if the camera 19 has a full motion video mode, then the full motion video mode can also be used. When in full motion video mode, the unmanned aircraft 18 simply follows the Flight Path keeping the camera 19 aimed towards the Target Path.

The unmanned aircraft 18 would follow the indicated Flight Path through autonomous flight. There are numerous computer systems that can be configured as a flight management system to achieve this available on the market today. The flight management system, either onboard, or on the ground and communicating to the unmanned aircraft 18 through some form of remote communication, would then track the progress of the unmanned aircraft 18 along the Flight Path and each time the unmanned aircraft 18 passes a Flight Capture Point, the camera 19 would be triggered to capture a frame. Or in the event that full motion video was selected, the camera 19 would be continually firing as it flew along the Flight Path. The position and orientation of the unmanned aircraft 18 would be monitored and the camera 19 would be aimed towards the corresponding Target Capture Point, or in the event that full motion video was selected, the flight management system would keep the camera aimed towards the nearest point on the Target Path. This may be accomplished by calculating the relative directional offset between the line moving forward on the Flight Path and the line from the Flight Capture Point to the Target Capture Point (or nearest point on the Flight Path for full motion video). This then results in a yaw and declination offset for the camera gimbal. Typically, these offsets are going to be a relative yaw of 90-degrees and a relative declination equal to the oblique down-look angle selected above (in the example, 40-degrees). However, since airborne systems are continually moved around by the air, offsets for a shift in position, a shift due to crabbing, or a shift in the yaw, pitch, or roll of the unmanned aircraft 18 would need to be accounted for. Again, this may be done by using the forward path along the Flight Path that the unmanned aircraft 18 is currently on and offsetting it by the relative yaw, pitch, and roll offsets of the unmanned aircraft 18 as measured by the position and orientation system, and then further adjusted by the relative yaw and declination as described above.

Once the complete circuit of the Flight Path has been completed, the flight management system may instruct the unmanned aircraft 18 to return to its launch point and land. The operator may pull any detachable storage or otherwise transfer the imagery from the onboard storage to a removable storage system or transfer the imagery via some form of network or communications link. The resulting images may then be used by the user terminal 14 and/or the host system 12 to produce a structure and/or damage report. Systems for producing a structure and/or damage report are described in patents U.S. Pat. Nos. 8,078,436; 8,145,578; 8,170,840; 8,209,152; 8,401,222, and a patent application identified by U.S. Ser. No. 12/909,962, the entire content of which are hereby incorporated herein by reference. The completed report would then be provided to the operator.

In some embodiments, additional data sets may be included within the structure report 78. For example, data sets may include, but are not limited to, weather data, insurance/valuation data, census data, school district data, real estate data, and the like.

Weather data sets may be provided by one or more databases storing information associated with weather (e.g., inclement weather). A weather data set within the structure report 78 may include, but is not limited to, hail history information and/or location, wind data, severe thunderstorm data, hurricane data, tornado data, and/or the like. In some embodiments, the one or more databases providing weather information may be hosted by a separate system (e.g., LiveHailMap.com) and provide information to the host system 12.

Insurance and/or valuation data sets may be provided by one or more databases storing information associated with housing insurance and/or valuation. An insurance and/or valuation data set may include, but is not limited to, insured value of the home, insurance premium amount, type of residence (e.g., multi-family, single family), number of floors (e.g., multi-floor, single-floor), building type, and/or the like. In some embodiments, the one or more databases may be hosted by a separate system (e.g., Bluebook, MSB, 360Value) and provide information to the host system 12.

The insurance and/or valuation data set may be included within the structure report 78 and provided to the user. For example, during underwriting of a home, an insurance company may be able to request the structure report 78 on a home that is recently purchased. The information within the structure report 78 may be integrated with insurance information provided by an insurance database and used to form a quote report. The quote report may be sent to the user and/or insurance company. Alternatively, the structure report 78 may be solely sent to the insurance company with the insurance company using the information to formulate a quote.

In another example, the structure report 78 may be used in an insurance claim. In the case of a catastrophe of a customer, one or more databases may be used to provide an insurance dataset with claim information in the structure report 78. For example, an insurance database having a policy in force (PIF) and a weather database may be used to correlate information regarding an insurance claim for a particular roof. This information may be provided within the structure report 78. Additionally, in the case of loss or substantial alterations to the structure 21, multiple images may be provided within the structure report 78 showing the structure 21 at different time periods (e.g., before loss, after loss). For example, FIG. 9 illustrates an exemplary screen shot 86 of the structure 21 having with an image 88a captured at a first time period (e.g., before loss), and an image 88b captured at a second time period (e.g., after loss).

Real estate and/or census data sets may also be including within structure report 78. The real estate and/or census data sets may be provided by one or more databases having detailed information of a home. For example, a real estate data set may include, but is not limited to, the homeowner's name, the purchase price of the home, number of times the home has been on the market, the number of days the home has been on the market, the lot size, and/or the like. The census data set may include information concerning the number of residents within the home. In some embodiments, the one or more databases may be hosted by a separate system (e.g., Core Logic) and provide information to the host system 12 to provide data sets as described herein.

Other services related to structure may be provided within the structure report 78. For example, using the square footage of the roofing footprint, a price quote may be generated on the cost of insulation for the roof (e.g., energy efficiency, insulation replacement, and the like). Additionally, audits may be performed using information within one or more databases. For example, using the roofing area of a structure, historically paid insurance claims for comparables, and validation of payment for a specific claim for the home, a comparison may be made to determine whether the service payment for the specific claim was within a certain threshold. Auditing, it should be understood, may be applied to other areas as described herein as well.

Although the images of residential structures are shown herein, it should be noted that the systems and methods in the present disclosure may be applied to any residential and/or commercial building or structure. Further, the systems and methods in the present disclosure may be applied to any man-made structure and/or naturally occurring structure.

From the above description, it is clear that the inventive concept(s) disclosed herein is well adapted to carry out the objects and to attain the advantages mentioned herein as well as those inherent in the inventive concept(s) disclosed herein. While presently preferred embodiments of the inventive concept(s) disclosed herein have been described for purposed of this disclosure, it will be understood that numerous changes may be made which will readily suggest themselves to those skilled in the art and which are accomplished within the scope and spirit of the inventive concept(s) disclosed herein and defined by the appended claims.

What is claimed is:

1. A computerized system, comprising:
   a computer system having an input unit, a display unit, one or more processors and one or more non-transitory computer readable medium, the one or more processors executing image display and analysis software to cause the one or more processors to:
   receive an identification of a structure from the input unit, the structure having multiple sides and an outline;
   obtain data indicative of multiple geographic positions pertaining to an outline of a structure having multiple sides and structure height information;
   obtain characteristics of a camera mounted onto an unmanned aircraft;
   generate unmanned aircraft information including:
   flight path information configured to direct the unmanned aircraft to fly a flight path around the structure that is laterally and vertically offset from the geographic positions of the outline of the structure, the lateral and vertical offset being dependent upon the structure height information, an orientation of the camera relative to the unmanned aircraft, and the characteristics of the camera; and,
   storing the unmanned aircraft information on the one or more non-transitory computer readable medium.

2. The computerized system of claim 1, wherein the image display and analysis software causes the one or more processors to cause a camera on the unmanned aircraft to capture at least one image of at least one of the sides of the structure.

3. The computerized system of claim 2, wherein the image display and analysis software causes the one or more processors to display an image of the structure on the display unit, the image depicting at least a portion of the outline of the structure.

4. The computerized system of claim 3, wherein the image is a first image, and wherein the image display and analysis software causes the one or more processors to display a second image and a flight path layer overlaying the second image, the flight path layer depicting the flight path that the flight path information is configured to direct the unmanned aircraft to fly.

5. The computerized system of claim 4, wherein the first image is selected from a group consisting of an oblique image and a nadir image; and the second image is selected from a group consisting of an oblique image and a nadir image.

6. The computerized system of claim 2, wherein the computer system includes a communication port and wherein the image display and analysis software causes the one or more processors to receive, via the communication port, one or more oblique images captured by the unmanned aircraft and store the one or more oblique images in the one or more non-transitory computer readable medium.

7. The computerized system of claim 6, wherein the computer system includes a user terminal having one or more first processors communicating with a computer system having one or more second processors and hosting an aerial imaging database, and wherein the image display and analysis software causes the one or more first processors to receive the one or more oblique images captured by the unmanned aircraft and communicate with the one or more second processors to load the one or more oblique images into the aerial imaging database.

8. The computerized system of claim 7, wherein the oblique images are first images, and wherein one or more second images are stored in the one or more non-transitory computer readable medium, and wherein the image display and analysis software causes the one or more processors to display the first images and the one or more second images simultaneously on the display unit.

9. The computerized system of claim 1, wherein the computer system includes a communication port and wherein the image display and analysis software causes the one or more processors to load the unmanned aircraft information onto the unmanned aircraft via the communication port.

10. A computerized system, comprising:
a computer system having an input unit, a display unit, one or more processors and one or more non-transitory computer readable medium, the one or more processors executing image display and analysis software to cause the one or more processors to:
  receive an identification of a structure from the input unit, the structure having multiple sides and an outline;
  obtaining data indicative of multiple geographic positions pertaining to the outline of the structure and structure height information,
  generating unmanned aircraft information including:
    flight path information configured to direct an unmanned aircraft to fly a flight path around the structure that is laterally and vertically offset from the geographic positions of the outline of the structure; and
    camera control information configured to cause a camera on the unmanned aircraft to capture oblique images of at least one of the sides of the structure; and
  storing the unmanned aircraft information on the one or more non-transitory computer readable medium.

11. The computerized system of claim 10, wherein the image display and analysis software causes the one or more processors to display an image of a structure on the display unit, the image depicting at least a portion of the outline of the structure.

12. The computerized system of claim 11, wherein the image is a first image, and wherein the image display and analysis software causes the one or more processors to display a second image and a flight path layer overlaying the second image, the flight path layer depicting the flight path that the flight path information is configured to direct the unmanned aircraft to fly.

13. The computerized system of claim 12, wherein the first image is selected from a group consisting of an oblique image and a nadir image; and the second image is selected from a group consisting of an oblique image and a nadir image.

14. The computerized system of claim 10, wherein the computer system includes a communication port and wherein the image display and analysis software causes the one or more processors to load the unmanned aircraft information onto the unmanned aircraft via the communication port.

15. The computerized system of claim 10, wherein the computer system includes a communication port and wherein the image display and analysis software causes the one or more processors to receive the one or more oblique images captured by the unmanned aircraft and store the one or more oblique images in the one or more non-transitory computer readable medium.

16. The computerized system of claim 15, wherein the computer system includes a user terminal having one or more first processors communicating with a computer system having one or more second processors and hosting an aerial imaging database, and wherein the image display and analysis software causes the one or more first processors to receive the one or more oblique images captured by the unmanned aircraft and communicate with the one or more second processors to load the one or more oblique images into the aerial imaging database.

17. The computerized system of claim 16, wherein the oblique images are first images, and wherein one or more second images are stored in the one or more non-transitory computer readable medium, and wherein the image display and analysis software causes the one or more processors to display the first images and the one or more second images simultaneously on the display unit.

* * * * *